United States Patent US 10,176,433 B2
Hastings et al. (45) Date of Patent: Jan. 8, 2019

(54) TRAINING A QUANTUM OPTIMIZER

(71) Applicant: Microsoft Technology Licensing, LLC, Redmond, WA (US)

(72) Inventors: Matthew Hastings, Seattle, WA (US); David Wecker, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/457,914

(22) Filed: Mar. 13, 2017

(65) Prior Publication Data

US 2017/0330101 A1 Nov. 16, 2017

Related U.S. Application Data

(60) Provisional application No. 62/335,993, filed on May 13, 2016.

(51) Int. Cl.
*G06F 17/11* (2006.01)
*G06N 99/00* (2010.01)
*G06N 5/00* (2006.01)

(52) U.S. Cl.
CPC .......... *G06N 99/002* (2013.01); *G06N 5/006* (2013.01); *G06N 99/005* (2013.01)

(58) Field of Classification Search
CPC .......................... G06N 99/002; G06N 99/005
See application file for complete search history.

(56) References Cited

U.S. PATENT DOCUMENTS 7,072,723 B2 7/2006 Kohn et al.
7,458,077 B2 11/2008 Duke
(Continued)

FOREIGN PATENT DOCUMENTS

CN 101242103 1/2011
CN 103279792 9/2013

OTHER PUBLICATIONS

Crama et al., "Pseudo-Boolean Optimization," *Oxford University Press*, 8 pp. (Dec. 2000).
(Continued)

*Primary Examiner* — Alexander H Taningco
*Assistant Examiner* — Kurtis R Bahr
(74) *Attorney, Agent, or Firm* — Klarquist Sparkman, LLP

(57) ABSTRACT

Among the embodiments disclosed herein are variants of the quantum approximate optimization algorithm with different parametrization. In particular embodiments, a different objective is used: rather than looking for a state which approximately solves an optimization problem, embodiments of the disclosed technology find a quantum algorithm that will produce a state with high overlap with the optimal state (given an instance, for example, of MAX-2-SAT). In certain embodiments, a machine learning approach is used in which a "training set" of problems is selected and the parameters optimized to produce large overlap for this training set. The problem was then tested on a larger problem set. When tested on the full set, the parameters that were found produced significantly larger overlap than optimized annealing times. Testing on other random instances (e.g., from 20 to 28 bits) continued to show improvement over annealing, with the improvement being most notable on the hardest problems. Embodiments of the disclosed technology can be used, for example, for near-term quantum computers with limited coherence times.

20 Claims, 9 Drawing Sheets

(56) References Cited

U.S. PATENT DOCUMENTS

| | | | |
|---|---|---|---|
| 7,877,333 B2 | 1/2011 | Macready | |
| 8,244,650 B2* | 8/2012 | Rose | G06N 99/002 706/13 |
| 8,700,689 B2 | 4/2014 | Macready et al. | |
| 8,977,576 B2 | 3/2015 | Macready | |
| 9,841,990 B2* | 12/2017 | Syrichas | G06Q 10/04 |
| 2011/0047201 A1* | 2/2011 | Macready | B82Y 10/00 708/446 |
| 2015/0193692 A1 | 7/2015 | Israel | |
| 2015/0262074 A1 | 9/2015 | Bruestle et al. | |
| 2015/0363708 A1* | 12/2015 | Amin | G06N 99/002 712/42 |
| 2016/0055421 A1 | 2/2016 | Adachi | |
| 2016/0321559 A1* | 11/2016 | Rose | G06N 99/005 |
| 2017/0017894 A1* | 1/2017 | Lanting | G06N 99/002 |

OTHER PUBLICATIONS

Crosson et al., "Different Strategies for Optimization Using the Quantum Adiabatic Algorithm," arXiv:1401.7320, 17 pp. (Jan. 2014).

da Silva et al., "Quantum perceptron over a field and neural network architecture selection in a quantum computer," *Journal of Neural Networks*, vol. 76, Issue C, 19 pp. (Apr. 2016).

Farhi et al., "A Quantum Adiabatic Evolution Algorithm Applied to Random Instances of an NP-Complete Problem," *Journal of Science*, vol. 292, Issue 5516, 15 pp. (Apr. 2001).

Farhi et al., "A Quantum Approximate Optimization Algorithm," Technical Report MIT-CTP/4610, 16 pp. (Nov. 2014).

Farhi et al., "A Quantum Approximate Optimization Algorithm Applied to a Bounded Occurrence Constraint Problem," Technical Report MIT-CTP/4628, 13 pp. (Dec. 2014).

Farhi et al., "Quantum Supremacy through the Quantum Approximate Optimization Algorithm," arXiv:1602.07674, 22 pp. (Feb. 2016).

Hogg et al., "Quantum Optimization," *Journal of Information Sciences*, vol. 128, Issue 3, 11 pp. (Oct. 2000).

International Search Report and Written Opinion dated Aug. 24, 2017, from International Patent Application No. PCT/US2017/032000, 16 pp.

Jukna, "19.4 The $k$-SAT problem," in *Extremal Combinatorics*, pp. 285-288 (Sep. 2011).

Mančinska et al., "On Finding Optimal Quantum Query Algorithms Using Numerical Optimization," $8^{th}$ *Int'l Conf. on Quantum Communication, Measurement, and Computing*, 4 pp. (Nov. 2006).

Perdomo-Ortiz et al., "A study of heuristic guesses for adiabatic quantum computation," *Quantum Inf. Process*, vol. 10, pp. 33-52 (Mar. 2010).

Wecker et al., "Progress towards practical quantum variational algorithms," *Physical Review A*, vol. 92, 10 pp. (Oct. 2015).

Wecker et al., "Towards Practical Quantum Variational Algorithms," *Journal of Physical Review A*, vol. 92, Issue 4, 10 pp. (Oct. 2015).

\* cited by examiner

TRAINING A QUANTUM OPTIMIZER

CROSS REFERENCE TO RELATED APPLICATIONS

This application claims the benefit U.S. Provisional Application No. 62/335,993 entitled "TRAINING A QUANTUM OPTIMIZER" filed on May 13, 2016, which is hereby incorporated herein in its entirety.

FIELD

This application relates generally to quantum computing. In particular, this application discloses embodiments for creating schedules used to operate a quantum computing device during a quantum computational process.

SUMMARY

Figure 1:
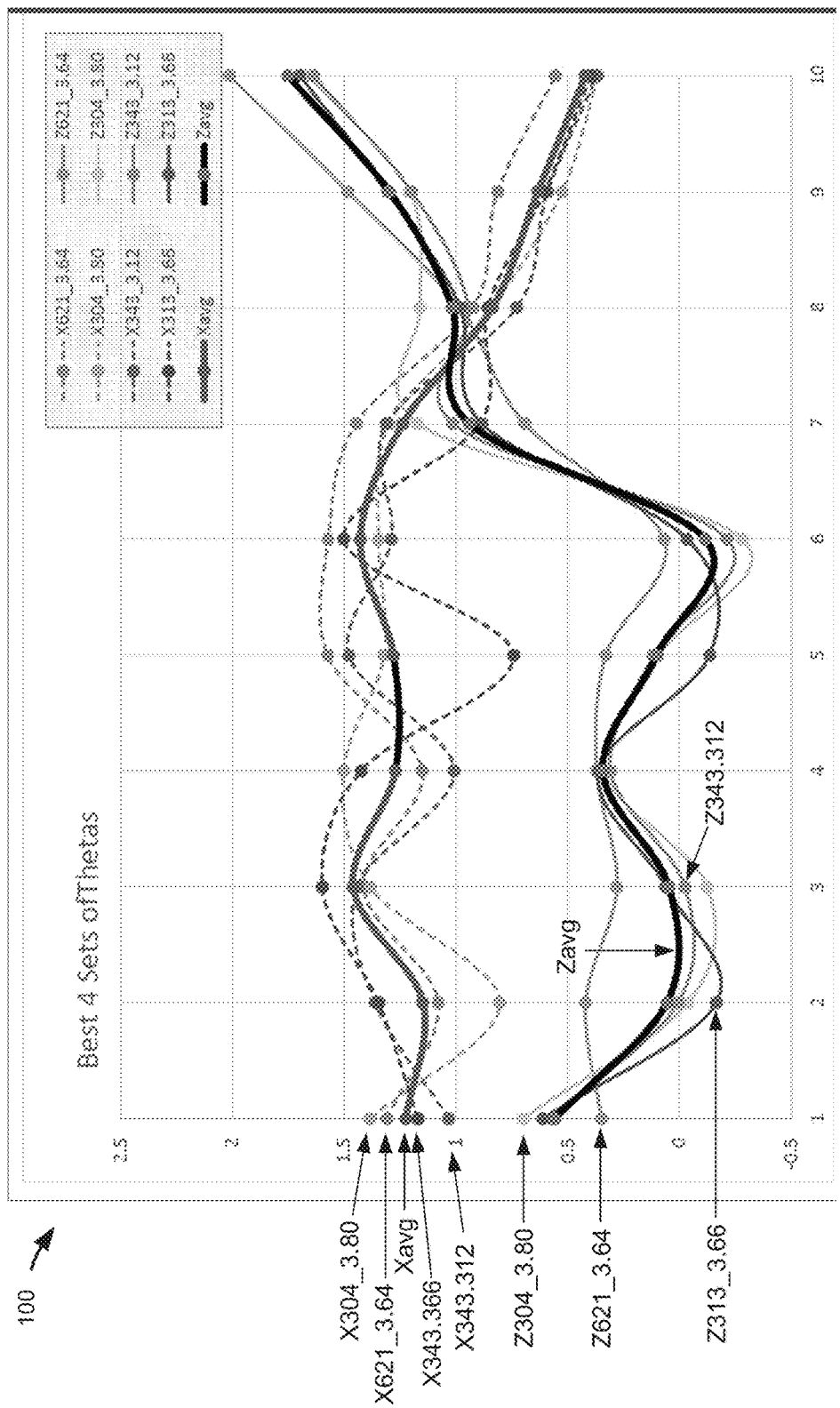
FIG. 1 is a schematic block diagram illustrating example schedules in accordance with the disclosed technology.

Disclosed herein are innovations in generating and applying schedules to control quantum computing devices during operation. Such techniques can be used in a quantum computing system, for example, to solve a target optimization problem. Such systems are therefore sometimes referred to as "quantum optimizers". The innovations can be implemented as part of a method or system for actually performing (or otherwise implementing) quantum operations in a physical implementation of a quantum computer. Any of the various innovations can be used alone in any combination or subcombination with one another or with other related techniques.

Certain embodiments disclosed herein are methods of operating a quantum computing device. More specifically, the example methods comprise causing a quantum computing device to evolve from a first state to a second state according to a schedule, the first state corresponding to a first Hamiltonian, the second state corresponding to a second Hamiltonian. The schedule includes an X schedule for Hamiltonian terms in the X basis, and a Z schedule for Hamiltonian terms in the Z basis. Further, the schedule is nonlinear or piecewise linear in one or both of the X schedule or the Z schedule. In some implementations, the schedule includes one or more sequences where the X schedule and the Z schedule converge toward one another and one or more sequences where the X schedule and the Z schedule diverge from one another. In further implementations, the X schedule and the Z schedule intersect only in a latter half of the respective schedules. In some implementations, one or both of the X schedule or the Z schedule has terms that vary, and the variation in terms is greater in a latter half of the respective schedule than in a front half of the respective schedule. In some embodiments, the example methods further comprise generating the schedule by performing a schedule-training process beginning from an initial schedule. The initial schedule of these embodiments includes an initial X schedule for Hamiltonian terms in the X basis and an initial Z schedule for Hamiltonian terms in the Z basis. The initial schedule can have a variety of characteristics that contribute to the final schedule. In some implementations, the initial X schedule and the initial Z schedule are both constant. In further implementations, one of the initial X schedule or the initial Z schedule is constant, and the other one of the initial X schedule or the initial Z schedule is nonconstant. In some implementations, one of the initial X schedule or the initial Z schedule is linear, and the other one of the initial X schedule or the initial Z schedule is nonlinear and nonconstant. In further implementations, one or both of the initial X schedule or the initial Z schedule have terms that vary with greater degree in a latter half of the respective schedule. In some implementations, one or both of the initial X schedule or the initial Z schedule have terms that vary with greater degree in a latter half of the respective schedule. In further implementations, one or both of the initial X schedule or the initial Z schedule have terms that are constant in a first half of the respective schedule and that vary in a second half of the respective schedule. Still further, in some embodiments, the second Hamiltonian is a solution to an optimization problem, and the schedule-training process uses one or more training problems having a size that is a smaller than a size of the optimization problem. In some embodiments, the method further comprises generating the schedule by: modifying an initial schedule from its initial state to create a plurality of modified schedules; testing the modified schedules relative to one or more problem instances; selecting one of the modified schedules based on an observed improvement in solving one or more of the problem instances. Further, in some implementations, the generating further comprises iterating the acts of modifying, testing, and selecting until no further improvement is observed in the selected modified schedule. In certain embodiments, for at least one step of the Z schedule or X schedule, the sign of the Z schedule or X schedule step is opposite of the sign of the respective final step of the Z schedule or X schedule. Further, in some embodiments, for at least one step of the Z schedule or X schedule, the sign of the Z schedule or X schedule step switches from positive to negative or vice versa. In further embodiments, one or more terms of the first Hamiltonian are noncommuting with corresponding terms of the second Hamiltonian.

Other embodiments disclosed herein are methods of generating schedules for operating a quantum computing device. For example, in certain embodiments, the method comprises generating a learned schedule for controlling a quantum computing device by performing a schedule-training process beginning from an initial schedule, the initial schedule including an initial X schedule for Hamiltonian terms in the X basis and an initial Z schedule for Hamiltonian terms in the Z basis. In certain implementations, at least one of the initial X schedule or the initial Z schedule is nonlinear. In some implementations, the initial X schedule and the initial Z schedule are both constant. In certain implementations, one of the initial X schedule or the initial Z schedule is constant, and the other one of the initial X schedule or the initial Z schedule is nonconstant. In some implementations, one of the initial X schedule or the initial Z schedule is linear, and the other one of the initial X schedule or the initial Z schedule is nonlinear and nonconstant. In certain implementations, one or both of the initial X schedule or the initial Z schedule have terms that vary with greater degree in a latter half of the respective schedule. In some implementations, one or both of the initial X schedule or the initial Z schedule have terms that are constant in a first half of the respective schedule and that vary in a second half of the respective schedule. In certain implementations, the learned schedule includes a learned X schedule and a learned Z schedule comprising one or more sequences where the learned X schedule and the learned Z schedule converge toward one another and one or more sequences where the learned X schedule and the learned Z schedule diverge from one another. In some implementations, the learned X schedule and the learned Z schedule intersect only in a latter half of the respective schedules. In certain implementations, one or both of the learned X schedule or the learned Z schedule have terms that vary, and the variation in terms is greater in a latter half of the respective schedule than in a front half of the respective schedule. In some implementations, for at least one step of the learned Z schedule or the learned X schedule, the sign of the learned Z schedule or learned X schedule step is opposite of the sign of the respective final step of the learned Z schedule or learned X schedule. In certain implementations, for at least one step of the learned Z schedule or learned X schedule, the sign of the learned Z schedule or learned X schedule step switches from positive to negative or vice versa.

Any of the example embodiments disclosed herein can be performed by a system comprising a processor and memory and/or by a tool adapted for use in a quantum optimization/schedule-generation/control process and implemented by one or more computing devices. Further, any of the example optimization/schedule-generation/control methods can be implemented as computer-executable instructions stored on a computer-readable media, which when executed by a computer cause the computer to perform the method.

DETAILED DESCRIPTION

I. General Considerations

Disclosed below are representative embodiments of methods, apparatus, and systems for generating schedules used to control quantum computing devices and/or for controlling such devices using the generated schedules.

Any of the disclosed example embodiments can be performed by a system comprising a classical processor and memory and/or at least in part by a quantum computing device (quantum computer) itself. The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts or features from one embodiment can be used with one or more method acts or features from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Further, some of the methods described herein can be altered by changing the ordering of the method acts described, by splitting, repeating, or omitting certain method acts, etc. Moreover, for the sake of simplicity, the attached figures may not show the various ways in which the disclosed methods can be used in conjunction with other methods. Additionally, the description sometimes uses terms like evaluate, "choose", or "perturb" to describe the disclosed technology. Such terms are high-level abstractions of the actual operations that are performed. The actual operations that correspond to these terms may vary depending on the particular implementation and are readily discernible by one of ordinary skill in the art.

As used in this application and in the claims, the singular forms a, an, and the include the plural forms unless the context clearly dictates otherwise. Additionally, the term includes means comprises. Further, as used herein, the term and/or means any one item or combination of any items in the phrase.

II. Introduction and Overview

The quantum approximation optimization algorithm (QAOA) is a quantum optimization algorithm, which itself is inspired by the quantum adiabatic algorithm (QAA) Consider a classical optimization problem. Typically, the optimization problem will optimize some objective over bit strings of length N. One encodes the objective function into a quantum Hamiltonian $H_1$ which is diagonal in the computational basis, using N qubits to encode possible bit strings in the obvious way, with the optimal value of the objection function corresponding to the smallest value of $H_1$. Then, one defines an additional Hamiltonian $H_0$, which is typically selected to be a transverse magnetic field on each qubit.

Then, the QAA comprises first preparing the system (e.g., one or more quantum processors (or other such quantum computing devices) of a quantum computer) in the ground state of Hamiltonian $H_0$ (which can be done easily since $H_0$ does not couple the different qubits) and then adiabatically evolving from $H_0$ to $H_1$. The simplest adiabatic path chosen is $H_s = (1-s)H_0 + sH_1$, for $s \in [0, 1]$. If the evolution time T is sufficiently long compared to the smallest inverse spectral gap along the path (where the minimum gap is denoted as $\Delta_{min}$), then with probability close to 1 the final state will be the ground state of $H_1$ and hence will solve the desired optimization problem. There are theoretical arguments that $\Delta_{min}$ can be super-exponentially small (scaling as $N^{-cN}$ for some constant c>0) for some problems, and so for these problems the time required for this adiabatic condition to hold is even longer than the time $2^N$ required by an algorithm that iterates over spin configurations (other numerics suggests that the problem may not be quite as bad as this for random instances). Additional details concerning the QAA and QAOA are disclosed, for example, in E. Farhi, J. Goldstone, and S. Gutmann, "A Quantum Approximate Optimization Algorithm", arXiv:1411.4028; E. Farhi, J. Goldstone, and S. Gutmann, "A Quantum Approximate Optimization Algorithm Applied to a Bounded Occurrence Constraint Problem", arXiv:1412.6062; and E. Farhi et al., "A quantum adiabatic evolution algorithm applied to random instances of an NP-complete problem", Science 292, 472 (2001).

Some improvements have instead been found by looking at faster evolution times for which the adiabatic condition does not hold, which are considered below.

The QAOA is based on the observation that to implement the evolution under a time-dependent Hamiltonian on a quantum computer, the simplest method is to Trotterize: first, decompose the evolution for a total time T into many small increments dt, small enough that the Hamiltonian $H_s$ is roughly constant on time dT. Then, again for small enough dt, one may decompose $\exp(iH_s dt) \approx \exp(i(1-s)H_0 dt)\exp(isH_1 dt)$. Thus, the total evolution is decomposed into a product of rotations by $H_0$, $H_1$ with certain angles, and the final state at the end of the evolution has the form $$\Psi_F = \exp(i\theta_p^X H_0)\exp(i\theta_p^Z H_1) \ldots$$

$$\exp(i\theta_2^X H_0)\exp(i\theta_2^Z H_1)\exp(i\theta_1^X H_0)\exp(i\theta_1^Z H_1)\Psi_I, \quad (1)$$

where $\theta_i^X, \theta_i^Z$ are some parameters determined by the evolution path (the superscripts X, Z indicate whether the corresponding term in the Hamiltonian is diagonal in the Z basis or in the X basis), where the "number of steps" p=T/dt, and $\Psi_I$ is the ground state of $H_0$ (for all i, $\theta_i^X, \theta_i^Z$ are small, of order t, but for small i, $\theta_i^X$ is larger than $\theta_i^Z$ but for larger i the reverse is true). The QAOA then instead restricts to a much smaller value of p but allows the angles $\theta_i^a$ to be chosen arbitrarily as variational parameters. The parameters may then be adjusted to optimize some objective function. For instance, the objective function could be the expectation value $\langle \Psi_F | H_1 | \Psi_F \rangle$.

In embodiments of the disclosed technology, and in comparison to other methods, an objective function is selected that is the overlap between $\Psi_F$ and the true ground state of the optimization problem. This is referred to as "targetting" the overlap. Further, embodiments of the disclosed technology employ a machine-learning-like approach that differs significantly from a worst-case analysis approach.

In particular embodiments, p>1 is considered and a "training set" is selected comprising (or consisting) of a small number of example problems. The training set can be selected from a variety of sources, but in one example implementation is chosen from the training sets discussed in E. Crosson et al., "Different Strategies for Optimization Using the Quantum Adiabatic Algorithm", arXiv: 1401.7320, which searches for instances which are hard for the QAA and then investigates whether a fast anneal or other modifications outperforms the original algorithm. After "learning" a set of parameter values which optimize the average overlap on this training set, embodiments of the disclosed technology consider various test sets, including many problems not in the training set.

As used herein, a given sequence of parameters is referred to as a "schedule". An "annealing Schedule" is a particular choice of parameters which approximates a linear anneal, so that the $\theta_i^X$ decrease linearly in i while the $\theta_i^Z$ increase linearly in i, while a "learned schedule" is a particular schedule obtained by optimizing parameters on a training set. a sequence of parameters.

By using embodiments of the disclosed technology, learned schedules are generated (e.g., through a learning process as described below) that give performance on various random test sets which outperform annealing schedules, including both slow and fast anneals (a sufficiently slow anneal will always find the ground state but for many of the test cases, the time required for such an anneal would be enormous, and if one restricts to anneals of modest time, then a fast anneal outperforms a slow one).

In particular example implementations, choosing a test set much larger than the training set is informative in showing the usefulness of the disclosed techniques. Learning a schedule is typically costly, as it is done by a numerical search which itself comprises many steps and in each step the objective function is evaluated, while testing the schedule requires a single evaluation of the objective function on each instance.

Further, in particular implementations, the schedules were trained on sizes N=20 but, tested on sizes up to N=28, where they continued to perform well. The trained schedules were tested on some MAX-3-SAT problems.

These particular sizes, however, should not be construed as limiting. For instance, while training may be performed on relatively small problem instances (e.g., N<50, or N<25), the size of of the problem instance used for testing or for the ultimate target computation may be, and typically would be, much larger. By training on a small size and testing on larger sizes, however, a protocol in which training runs are performed on a classical computer at smaller values of N and then testing (or operational) runs are performed on a quantum computer at larger values of N is established. Also, one could train on the quantum computer, but time on the quantum computer may be more expensive than time on the classical computer; also, one might use the schedule found on the classical computer at small values of N as a starting point for further optimization of the schedule at larger values of N on the quantum computer.

III. Problem Definition and Ansatz

To illustrate the principles of the disclosed technology, an example optimization problem is considered. In the following discussion, the MAX-2-SAT problem is considered, but this implementation is not to be construed as limiting, as a variety of optimization problems can be used. In the illustrated example, the MAX-2-SAT problem is defined as follows. One has N different Boolean variables, denoted $x_i$. Then, there are several clauses, each of which is a Boolean OR of two terms, each term being a variable or its negation. Thus, possible clauses are all of one of the four forms $$x_i \vee x_j, \overline{x_i} \vee x_j, x_i \vee \overline{x_j}, \overline{x_i} \vee \overline{x_j},$$

where $\overline{x_i}$ denotes the negation of a variable. The problem is to find a choice of variables $x_i$ that maximizes the number of satisfied clauses.

This problem can be cast into the form of an Ising model as follows. Consider a system of N qubits. Let $\sigma_i^z$ denote the Pauli Z operator on spin i. Let $\sigma_i^Z=+1$ correspond to $x_i$ being true and $\sigma^Z=+1$ correspond to $x_i$ being false. Then, a clause $x_i \vee x_j$ is true if $$\frac{1}{4}(1-\sigma_i^z)(1-\sigma_j^z)$$

is equal to 0 and is false if $$\frac{1}{4}(1-\sigma_i^z)(1-\sigma_j^z) = 1.$$

Indeed, each of the four possible types of clauses above can be encoded into a term $$\frac{1}{4}(1 \pm \sigma_i^z)(1 \pm \sigma_j^z)$$

which is 0 if the clause is true and 1 if the clause is false, with the sign ± being chosen based on whether the clause contains a variable or its negation. $H_1$ is defined to be the sum of these terms $$\frac{1}{4}(1 \pm \sigma_i^z)(1 \pm \sigma_j^z)$$

over all clauses in the problem. Similarly, the following is defined:

$$H_0 = \sum_i \frac{1}{2}(1-\sigma_i^x), \qquad (2)$$

where $\sigma_i^x$ is the Pauli X operator on spin i.

With these choices of $H_0$, $H_1$, the ground state energy of $H_0$ is equal to 0 and the ground state energy of $H_1$ is equal to the number of violated clauses. Both $H_0$, $H_1$ have integer eigenvalues. A "modified ansatz" can be also be used, defined as follows:

$$\Psi_F = \exp[i(\theta_p^X H_0 + \theta_p^Z H_1)] \ldots$$

$$\exp[i(\theta_2^X H_0 + \theta_2^Z H_1)]\exp[(i\theta_1^X H_0 + \theta_1^Z H_1]\Psi_I. \qquad (3)$$

The difference is that each exponential contains a sum of two non-commuting terms, both $H_0$ and $H_1$. It is noted that in the case of the ansatz of Eq. (1), the quantities $\theta_i^a$ indeed are angles in that $\Psi_F$ is periodic in these quantities mod 2# if $H_0$, $H_1$ have integer eigenvalues, but for the modified ansatz of Eq. (3) the quantifies $\theta_i^a$ are generally not periodic mod 2#. The modified ansatz, in this example, was chosen because it was found that choosing the modified ansatz led to a significantly easier numerical optimization in practice. In the gate model of quantum computation, the simplest way to implement the modified ansatz is to approximate each exponential $\exp[i(\theta_i^X H_0 + \theta_i^Z H_1)]$ using a Trotterization, which thus corresponds to a particular choice of parameters in the "original ansatz" of Eq. (1), albeit with a larger p. In the example embodiments disclosed below, this ansatz is continued to be used, though such usage should not be construed as limiting.

IV. Training

A. Problem Instances

A variety of training sets can be used in embodiments of the disclosed technology. In one example implementation, training sets are taken from examples in E. Crosson et al., "Different Strategies for Optimization Using the Quantum Adiabatic Algorithm", arXiv:1401.7320. In this section, the construction of the instances there are reviewed. The training sets can be, for instance, randomly constructed. For instance, for the example test cases studied herein, the training sets were randomly constructed instances with N=20 variables and 60 clauses. For each clause, the variables i, j were chosen uniformly at random, and also each variable was equally likely to be negated or not negated, subject to the constraints that i≠j and that no clause appears twice, though the same pair of variables may appear in more than one clause. Thus, it was permitted to have clauses $x_i \vee x_j$ and $x_i \vee \overline{x_j}$ but it was not permitted to have $x_i \vee x_j$ appear twice in the list of clauses. From these random instances, only those instances that have a unique ground state were retained. In this way, 202,078 instances were generated. From these instances, a subset of hard instances were determined. In this particular example, these are instances for which an implementation of the QAA using a linear annealing path $H_s=(1-s)H_0+sH_1$ and an evolution time T=100 has a small success problem of less than $10^{-4}$ of finding the ground state.

The Schrodinger equation can be numerically integrated in continuous time for this example. This leaves a total of 137 hard instances, comprising 136 unique instances. In the rest of the section, these instances are simply referred to as "instances", without specifying that they are the hard instances.

Below, when comparing example embodiments of the disclosed "learned schedules" to annealing schedules, the comparison is made as a ratio of the squared overlap for a learned schedule with that from the optimized annealing schedule from E. Crosson et al., "Different Strategies for Optimization Using the Quantum Adiabatic Algorithm", arXiv:1401.7320. One of the main results is that, by using embodiments of the disclosed technolgoy, one can learn schedules for which this ratio is significantly larger than 1. As more fully discussed below, if one instead made a comparison to a QAA with a fixed annealing time for all instances of E. Crosson et al., "Different Strategies for Optimization Using the Quantum Adiabatic Algorithm", arXiv:1401.7320, this would lead to a further slight improvement in the ratio.

B. Training Methods

Rather than training on the full set of instances (e.g., of 136 instances), embodiments of the disclosed technology use smaller training sets (e.g., of, for example, 13 randomly chosen instances from this set). This was done partly to speed up the simulation, as then evaluating the average success probability can be done more rapidly on the smaller set, but was primarily done so that testing on the set of all instances would give a test set much larger than the training set: this is desirable to determine whether the learned parameters generalize to other problems beyond the training set (such as problems that better resemble the type of optimization problems to be solved in an actual quantum computer).

In certain example implementations, given a training set, the objective function is the average, over the training set, of the squared overlap between the state $\Psi_F$ and the ground state of $H_1$. To compute the objective function, and in accordance with one example implementation, the state $\Psi_F$ is computed; this can be done by approximating the exponentials $\exp[(i\theta_i^X H_0 + \theta_i^Z H_1]$ by a Trotter-Suzuki formula, as $$\exp[(i\theta_i^X H_0 + \theta_i^Z H_1)] \approx \left(\exp\left(i\frac{\theta_i^Z}{2n}H_1\right)\exp\left(i\frac{\theta_i^X}{n}H_0\right)\exp\left(i\frac{\theta_i^Z}{2n}H_1\right)\right)^n,$$

where n=4 is chosen.

This objective function can be treated as a black box, and the parameters can be optimized. For example, in certain embodiments, the schedule can be determined using an optimization technique that starts from a selected starting point. In accordance with embodiments of the disclosed technology, these starting points are substantially distinct from those considered in other works and have one or more characteristics that lead to improved schedules, discussed more fully below. Examples of starting points (starting schedules) that can be used in embodiments of the disclosed technology are shown in Table 1. Briefly, the example optimization algorithm used in this disclosure is: given an "initial schedule" (e.g., a schedule chosen as the starting point for the optimization), perform a greedy noisy search, slightly perturbing the values of each $\theta_i^a$ at random, and accepting the perturbation if it improves the objective function for a total of, for example, 150 evaluations of the objective function (though other numbers of evaluations can be used). The step size for the greedy search, in particular example implementations, is determined in a simple way: every fifty trials, the number of acceptances is counted: if the number is large, the step size is increased; and if the number is small, the step size is reduced. This example implementation can be modified, for instance, by altering the number of trials and the threshold for the number of acceptances. After the noisy search, one can then use Powell's conjugate direction method until it converges (see, e.g., M. J. D. Powell, Computer Journal 7, 155 (1964)). Powell's method and the noisy search can then be alternated (e.g., if one does not improve the result) until no further improvement is obtained. One nonlimiting example of such a process is described in the Appendix below.

In certain example embodiments, this numerical optimization was performed for 5 different randomly chosen training sets of 13 instances (10% of the data). For each training set, 5 different runs of the optimization were performed for a variety of initial schedules, thus giving 25 runs for each initial schedule. These values should not be construed as limiting, however, as different numbers of optimization runs and/or initial schedules are possible and within the scope of the disclosed technology.

While different choices of initial schedule led to very different performances of the final schedule found at the end of the optimization, for any given choice of initial schedule, the results were roughly consistent across different choices of the training set and different optimization runs. Certain training sets tended to do slightly better (schedules trained on them tended to perform better when tested on the full set as described in the next section) but in general, for an appropriate choice of initial schedules, it was observed that all choices of training sets and all runs of the optimization with that initial schedule and training set led to good performance on the full set.

C. Results

The learned schedules that performed well had a form quite different from an annealing schedule. Instead, the form of many of the good schedules was similar to that in FIG. 1. The schedule begins with $\theta^X$ large and fairly flat but $\theta^Z$ oscillating near zero. Then, at the end of the schedule, the schedule is more reminiscent of an anneal, with $\theta^Z$ increasing (albeit with some oscillations) and $\theta^X$ decreasing fairly linearly.

In some embodiments of the disclosed technology, and as illustrated in FIG. 1, the learned schedule has one or more of the following characteristics: (a) the learned schedule is nonlinear or piecewise linear in one or both of the learned X schedule or the learned Z schedule; (b) the learned schedule includes one or more sequences where the learned X schedule and the learned Z schedule converge toward one another and one or more sequences where the learned X schedule and the learned Z schedule diverge from one another; (c) the learned X schedule and the learned Z schedule intersect only in a latter half of the respective schedules; and/or (d) one or both of the learned X schedule or the learned Z schedule have terms that vary, and the variation in terms is greater in a latter half of the respective schedule than in a front half of the respective schedule.

To find the schedules shown in FIG. 1, an appropriate choice of an initial schedule was made (described further below). Notably, if one were to choose an initial schedule that was an annealing schedule, the search over schedules would become stuck in local optima that would not perform as well.

In particular, and with reference to chart 100 of FIG. 1, the dashed curves show $\theta^X$ and the solid curves show $\theta^Z$ (both shown on the y-axis) for a schedule having ten steps (shown along the x-axis). Four different learned schedules are shown; the format such as X621$_3$.64 indicates that this curve is $\theta^X$, for a schedule started using initial schedule 6; the 21 indicate the particular training set and run (these numbers are just keys to a random number generator but they differentiate the three different curves that use initial schedule 3); the 3.64 indicates the average improvement for that schedule. The Xavg, Zavg curves show the parameters averaged over those four schedules.

After discovering this form after some experimentation, a variety of schedules which had this form were studied. These initial schedules were labelled by a key ranging; from 2 to 14 (key values of 0, 1 corresponded to schedules with a different form that did not perform well and are not reported here). These schedules are shown in Table I.

Table I shows some variety of the schedules, but also shows some common characteristics among at least two or more of the initial schedules. In particular, at least some of the initial schedules can be characterized by having $\theta^X$ large for the initial steps (ranging from the first 5 steps in schedule 7 to the first 9 steps in schedule 3 to all steps in schedule 2) and $\theta^Z$ small on those same steps, and then $\theta^X$ decreasing linearly after than to 0 while $\theta^Z$ increases. In some of these schedules, the $\theta^X$ schedule is composed of two pieces, and it is linear on each piece; for example, in schedule 11, $\theta^X$ is constant initially, then linearly decreases to 0 on the last 3 steps. Still further, in certain embodiments of the disclosed technology and as illustrated by Table I, the initial schedule has one or more of the following characterisitcs: (a) at least one of the initial X schedule or the initial Z schedule is nonlinear; (b) the initial X schedule and the initial Z schedule are both constant; (c) one of the initial X schedule or the initial Z schedule is constant, and the other one of the initial X schedule or the initial Z schedule is nonconstant; (d) one of the initial X schedule or the initial Z schedule is linear, and the other one of the initial X schedule or the initial Z schedule is nonlinear and nonconstant; (e) one or both of the initial X schedule or the initial Z schedule have terms that vary with greater degree in a latter half of the respective schedule; and/or (f) one or both of the initial X schedule or the initial Z schedule have terms that are constant in a first half of the respective schedule and that vary in a second half of the respective schedule.

Further, Table I shows numerous initial schedules for completeness in order to show that all such choices led to some improvement but that certain choices consistently led to more improvement. Some of the schedules are described as "Frozen"; in this case, the $\theta^Z$ variables were not allowed to change during the learning process and only the $\theta^X$ variables were allowed to change. Thus, the final learned schedule had the same $\theta^Z$ variables as the initial and this was chosen to be $\theta_i^Z$.

TABLE I

The schedules for $\theta_i^Z$, $\theta_i^X$. The 10 entries in a line such as "1111111150" shows a sequences of $\theta_i$ for i = 1, . . . , 10 in order. An entry 1 or 0 indicates a 1 or 0, while 5 indicates 0.5. "Linear" indicates a linear function, $\theta_i^Z = 0.5$, 0.15, . . . , 0.95 for i = 1, . . . , 10. "Frozen" also indicates a linear function, but with $\theta^Z$ held fixed during learning as described in test. "Avg" indicates that the initial schedule is the average schedule shown in FIG. 1.

| Key | $\theta^X$ | $\theta^Z$ |
|---|---|---|
| 2 | 1111111111 | 0000000000 |
| 3 | 1111111110 | 0000000001 |
| 4 | 1111100000 | 0000011111 |
| 5 | 0000000000 | 1111111111 |
| 6 | 1111111111 | Linear |
| 7 | 1111100000 | Linear |
| 8 | 1111111110 | 000000001 |
| 9 | 1111111110 | Linear |
| 10 | 1111111110 | Frozen |
| 11 | 1111111150 | 0000000051 |
| 12 | 1111111150 | Linear |
| 13 | 1111111150 | Frozen |
| 14 | Avg | Avg | changing linearly as a function of i. These schedules may be simpler to implement, in hardware due to less need for complicated control of $\theta^Z$. They showed some improvement but not quite as much as others.

The improvement is shown in Table II. In this table a, "ratio of averages" is reported. That is, the squared overlap of $\Psi_F$ is computed with the ground state for each instance and average over instances. Then, the ratio of this average is computed to the same average using the optimized annealing times of E. Crosson et al., "Different Strategies for Optimization Using the Quantum Adiabatic Algorithm", arXiv: 1401.7320. The parameters for certain schedules which performed well are shown in the Appendix.

Another option than reporting the "ratio of averages" is to report an "average of ratios". This means computing, for each instance, the ratio of the squared overlap of $\Psi_F$ with the ground state for a given learned schedule to the same overlap for an optimized anneal. Then, averaging this ratio over instances. The result would be different and would lead to a larger improvement because the learned schedules do better on the harder instances as shown in FIG. 2.

Figure 2:
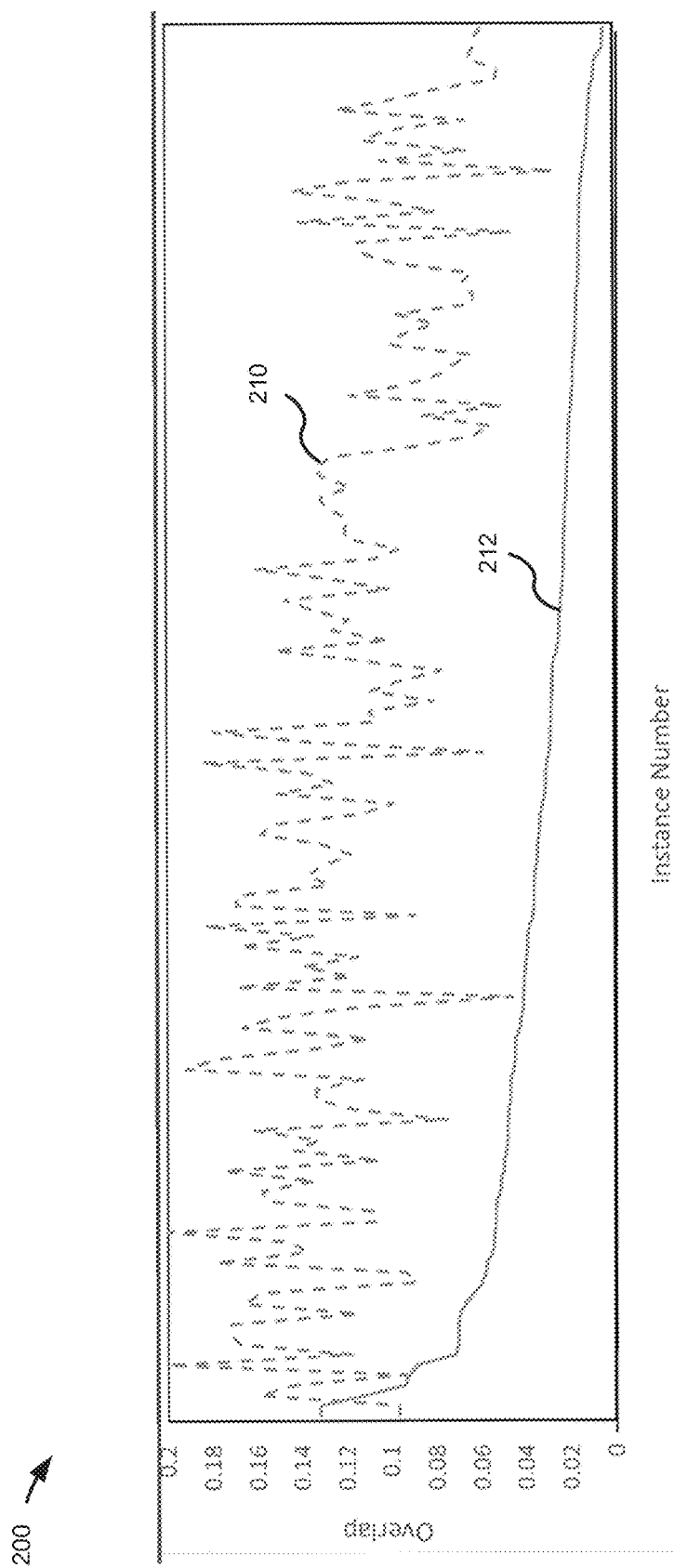
FIG. 2 is a graph showing different instances relative to overlap for a learned schedule and an optimized anneal.

In graph 200 of FIG. 2, the x-axis labels different instances, and the y-axis shows overlap. The

TABLE II

Improved compared to optimized annealing times. The entry report the ratio of averages (see text). First column "Initial" labels ininitial schedule from table I. Columns 0, 1, 2, 3, 4 label different training sets. Column "Avg" is average of that row over training sets. Row "Avg" is average of that training set over choices of Initial. One can see that there is some variance from one training set to another, but the performance is roughly consistent. The best rows are 14, 11, 8.

| Initial | 0 | 1 | 2 | 3 | 4 | Avg |
|---|---|---|---|---|---|---|
| 2 | 1.4 | 2.0 | 1.7 | 1.9 | 2.2 | 1.8 |
| 3 | 4.2 | 3.6 | 3.5 | 3.3 | 3.8 | 3.7 |
| 4 | 2.5 | 2.4 | 2.4 | 2.3 | 2.4 | 2.4 |
| 5 | 2.4 | 2.3 | 2.4 | 2.4 | 2.4 | 2.4 |
| 6 | 2.9 | 3.0 | 3.1 | 3.3 | 2.6 | 3.0 |
| 7 | 2.4 | 2.0 | 2.3 | 2.2 | 2.1 | 2.2 |
| 8 | 3.5 | 3.5 | 3.4 | 3.5 | 3.7 | 3.5 |
| 9 | 2.7 | 3.2 | 2.8 | 3.1 | 3.4 | 3.0 |
| 10 | 2.5 | 2.2 | 2.1 | 2.4 | 2.1 | 2.3 |
| 11 | 4.4 | 4.2 | 4.2 | 4.1 | 4.1 | 4.2 |
| 12 | 3.1 | 2.9 | 3.3 | 3.5 | 3.1 | 3.2 |
| 13 | 2.0 | 2.4 | 2.3 | 2.0 | 2.0 | 2.1 |
| 14 | 4.5 | 4.5 | 4.3 | 4.5 | 4.4 | 4.4 |
| Avg | 3.0 | 2.9 | 2.9 | 2.9 | 3.0 | 2.9 | clashed curve 210 is from the learned schedule while the solid curve 212 is for the optimized anneal. Instances are sorted by overlap for optimized anneal.

V. Testing on Random Instances with N=20, 24, 28

In addition to testing against the instances discussed above to determine whether the learned schedules generalize to larger sizes and other ensembles, further problem instances were constructed for N=20, 24, 28. In particular testing examples, the case of N=20 was tested.

In particular, clauses of 60, 72, 84 were taken, respectively, so that the clause-to-variable ratio was maintained. The same ensemble as in E. Crosson et al., "Different Strategies for Optimization Using the Quantum Adiabatic Algorithm", arXiv:1401.7320 was used, so that clauses were chosen at random subject to the constraint that no clause appeared twice and that the problem had a unique ground state. However, rather than finding hard instances based on a continuous time anneal at time T=100, a slightly different method was used. This was partly done to speed up the search for hard instances; in E. Crosson et al., "Different Strategies for Optimization Using the Quantum Adiabatic Algorithm", arXiv:1401.7320, fewer than 1/1000 of the instances were hard by that standard. However, it was primarily done to test the learned schedules in a more general setting and to consider a range of hardnesses to demonstrate that the learned schedules perform relatively better on the harder instances.

In testing hardness, annealing schedules were used. Since a comparison will be made to annealing schedules, appropriate notation is now introduced. Let L(p,x,z) denote the schedule with p steps and $\theta_i^Z = zi/(p+1)$ and $\theta_i^X = z(p+1-i)/(p+1)$.

L(10,1,1) was used to determine hardness. 3346 random instances were constructed and sampling was performed from 6.8% of the instances which had the smallest squared overlap with L(10,1,1), yielding 170 instances (for N=28, a smaller number of instances was generated so that only 72 were retained). On these instances, a comparison of various algorithms is shown in Tables IV, III. Included in these tables are results for the instances of E. Crosson et al., "Different Strategies for Optimization Using the Quantum Adiabatic Algorithm", arXiv:1401.7320, (labeled in the tables as "EC") as now the tables compare the performance of various learned schedules to L(10,1,1) rather than to an optimized anneal. For the instances described in this section, only a comparison to schedules of the form L(p,x,z) is made, which give a discrete approximation to an anneal, rather than comparing to anneal. This was done to simplify the numerics. The results for the instances of E. Crosson et al., "Different Strategies for Optimization Using the Quantum Adiabatic Algorithm", arXiv:1401.7320, is that such schedules give performance similar to that of a continuous time QAA.

In these tables, the learned schedules are identified by a pair such as 31(9). In this case, the number 31 is an arbitrary key labelling the schedule. The number in parenthesis, 9 in this case, indicates that schedule 31 was obtained by starting from initial schedule 9 in Table I. Only the keys are given here, because later reference to certain schedules is also made by key; for example, number 154 which is one of the best performing by several measures.

Figure 3:
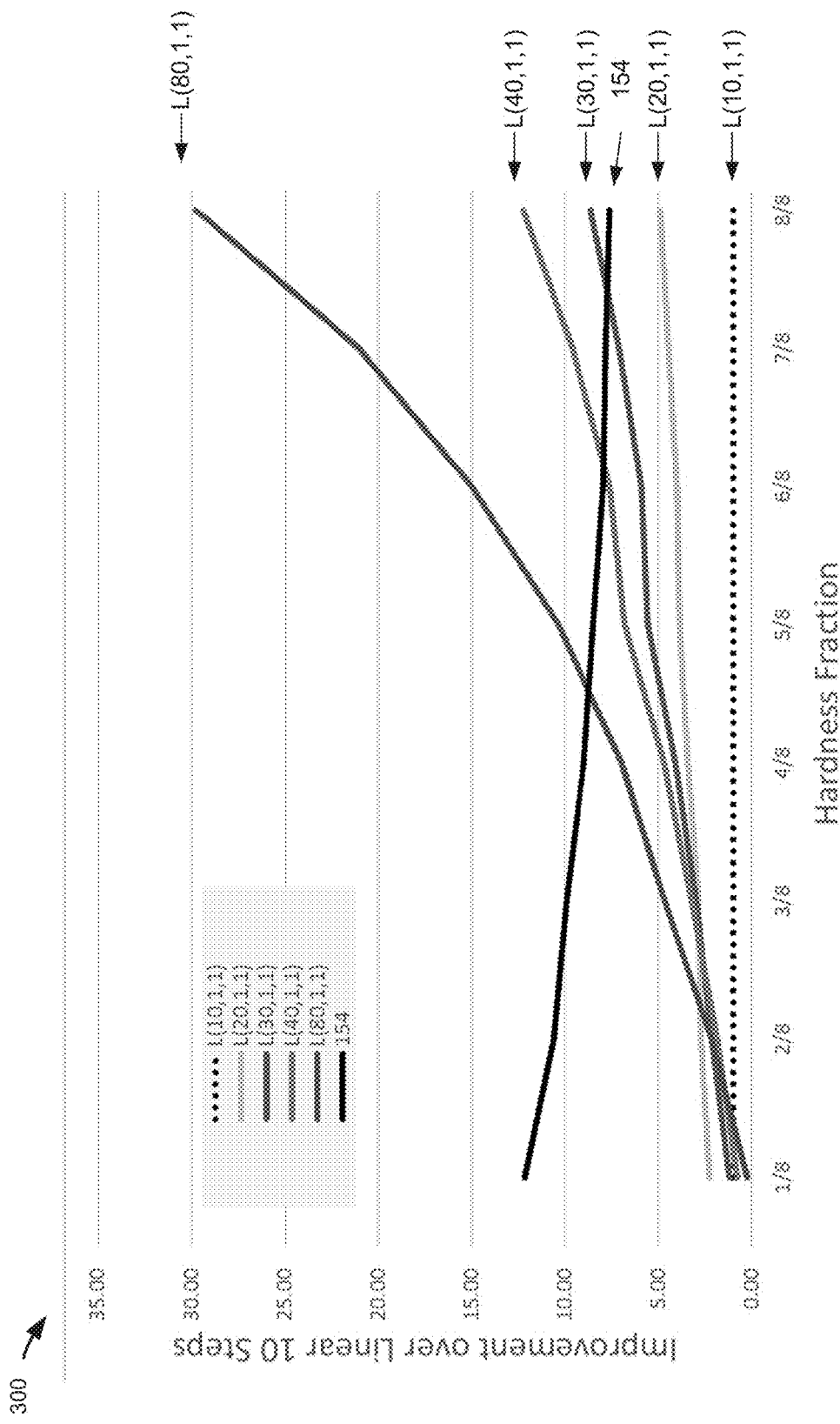
FIG. 3 is a graph showing the performance of various schedules compared to L(10,1,1).

Note that while the learned schedules, in particular 154, improve over L(10,1,1), it was found that slower anneals such as L(80,1,1) outperform the learned schedules on the N=20, 24, 28 instances. However, on instances from E. Crosson et al., "Different Strategies for Optimization Using the Quantum Adiabatic Algorithm", arXiv:1401.7320, the slower annealing schedules do significantly worse, with L(80,1,1) much worse than L(10,1,1). The reason for this can be seen by further dividing the problems based on their hardness for L(80,1,1). For example, the problems were binned into 8 different groups depending upon the squared overlap for L(80,1,1). FIG. 3 shows the performance compared to L(10,1,1) of various schedules for each bin.

More specifically, graph 300 in FIG. 3 shows the ratio of averages for 8 different subsets of the MAX-2-SAT problem with N=20, chosen by binning by hardness for L(80,1,1). Various schedules to L(10,1,1) were also compared. Different colors label different schedules. On hardest instances, 154 does best, followed by L(20,1,1),L(30,1,1),L(10,1,1),L(40,1,1),L(80,1,1) in sequence.

Thus, it was found that learned schedule 154 (chosen simply as it was the best example, similar performance results are expected from other learned schedules) outperform L(10,1,1) everywhere, while the performance compared to L(80,1,1) varies: it outperform L(80,1,1) on the problems where L(80,1,1) does worst. On the problems where L(80,1,1) does worst, even L(10,1,1) outperforms L(80,1,1). This fits with the observed performance of the learned on the problems of E. Crosson et al., "Different Strategies for Optimization Using the Quantum Adiabatic Algorithm", arXiv:1401.7320, as those problems were chosen to be difficult for a slow anneal.

Notably, the data shows that as N increases, the ratio between the learned schedules and L(10,1,10 is increasing. This may partly be due to the fact that the overlap for all schedules is

TABLE IV

First column labels schedule. Next four columns give ratio of average comparing to L(10, 1, 1) for various test sets from. Note that the entry in the last four columns is 1 for the schedule L(10, 1, 1) because there it is being compare to itself.

| Sched | Ratio EC | N = 20 | N = 24 | N = 28 |
|---|---|---|---|---|
| 8 | 4.4 | 3.5 | 4.7 | 5.6 |
| 31 | 4.2 | 2.5 | 3.2 | 3.7 |
| 49 | 4.2 | 1.4 | 1.5 | 1.6 |
| 84 | 4.7 | 3.4 | 4.3 | 5.3 |
| 113 | 4.4 | 1.3 | 1.3 | 1.4 |
| 122 | 4.2 | 1.5 | 1.7 | 1.8 |
| 154 | 4.6 | 4.4 | 5.9 | 7.6 |
| 157 | 4.6 | 4.1 | 5.5 | 7.1 |

TABLE III

First column labels schedule. Next four columns gives the average overlap for various test sets for each schedule; N = 20, 24, 28 refers to random instances constructed following procedure described in this section. Last four columns give average (over instances) of ratio (of square overlap) comparing to L(10, 1, 1). Note that the entry in the last four columns is 1 for the schedule L(10, 1, 1) because there it is being compare to itself.

| | Overlap | | | | Ratio | | | |
|---|---|---|---|---|---|---|---|---|
| Sched | EC | N = 20 | N = 24 | N = 28 | EC | N = 20 | N = 24 | N = 28 |
| 8 (8) | 0.111 | 0.068 | 0.040 | 0.025 | 11.9 | 4.4 | 6.7 | 8.2 |
| 31 (9) | 0.108 | 0.048 | 0.028 | 0.017 | 8.1 | 2.9 | 4.0 | 5.0 |
| 49 (9) | 0.108 | 0.026 | 0.013 | 0.007 | 6.6 | 1.6 | 1.7 | 2.0 |
| 84 (11) | 0.120 | 0.065 | 0.037 | 0.023 | 10.4 | 4.1 | 5.9 | 7.1 |
| 113 (12) | 0.111 | 0.024 | 0.011 | 0.006 | 6.8 | 1.5 | 1.6 | 1.8 |
| 122 (12) | 0.107 | 0.029 | 0.014 | 0.008 | 7.0 | 1.7 | 1.9 | 2.3 |
| 154 (14) | 0.117 | 0.085 | 0.050 | 0.034 | 10.5 | 5.2 | 7.7 | 10.5 |
| 157 (14) | 0.116 | 0.079 | 0.047 | 0.032 | 10.6 | 4.9 | 7.4 | 0.8 |
| L(10, 1, 1) | 0.025 | 0.019 | 0.009 | 0.004 | 1.0 | 1.0 | 1.0 | 1.0 |
| L(10, 2, 2) | 0.024 | 0.075 | 0.039 | 0.021 | 1.0 | 4.0 | 5.1 | 5.3 |
| L(10, 3, 3) | 0.011 | 0.105 | 0.058 | 0.032 | 0.5 | 5.8 | 8.3 | 8.3 |
| L(10, 4, 4) | 0.006 | 0.118 | 0.056 | 0.038 | 0.3 | 6.5 | 13.5 | 9.7 |
| L(20, 1, 1) | 0.028 | 0.073 | 0.028 | 0.022 | 1.3 | 3.9 | 6.4 | 5.4 |
| L(40, 1, 1) | 0.008 | 0.159 | 0.077 | 0.054 | 0.4 | 8.8 | 18.8 | 14.1 |
| L(80, 1, 1) | 0.0003 | 0.288 | 0.164 | 0.132 | 0.0 | 16.3 | 43.5 | 34.1 |

TABLE IV-continued

First column labels schedule. Next four columns give ratio of average comparing to L(10, 1, 1) for various test sets from. Note that the entry in the last four columns is 1 for the schedule L(10, 1, 1) because there it is being compare to itself.

| Sched | Ratio EC | N = 20 | N = 24 | N = 28 |
|---|---|---|---|---|
| L(10, 1, 1) | 1.0 | 1.0 | 1.0 | 1.0 |
| L(10, 2, 2) | 0.9 | 3.9 | 4.5 | 4.8 |
| L(10, 3, 3) | 0.4 | 5.5 | 6.8 | 7.2 |
| L(10, 4, 4) | 0.2 | 6.2 | 6.5 | 8.5 |
| L(20, 1, 1) | 1.1 | 3.8 | 3.3 | 4.9 |
| L(40, 1, 1) | 0.3 | 8.3 | 9.0 | 12.3 |
| L(80, 1, 1) | 0.01 | 15.0 | 19.2 | 29.8 | decreasing with increasing N.

A. MAX-3-SAT

Figure 4:
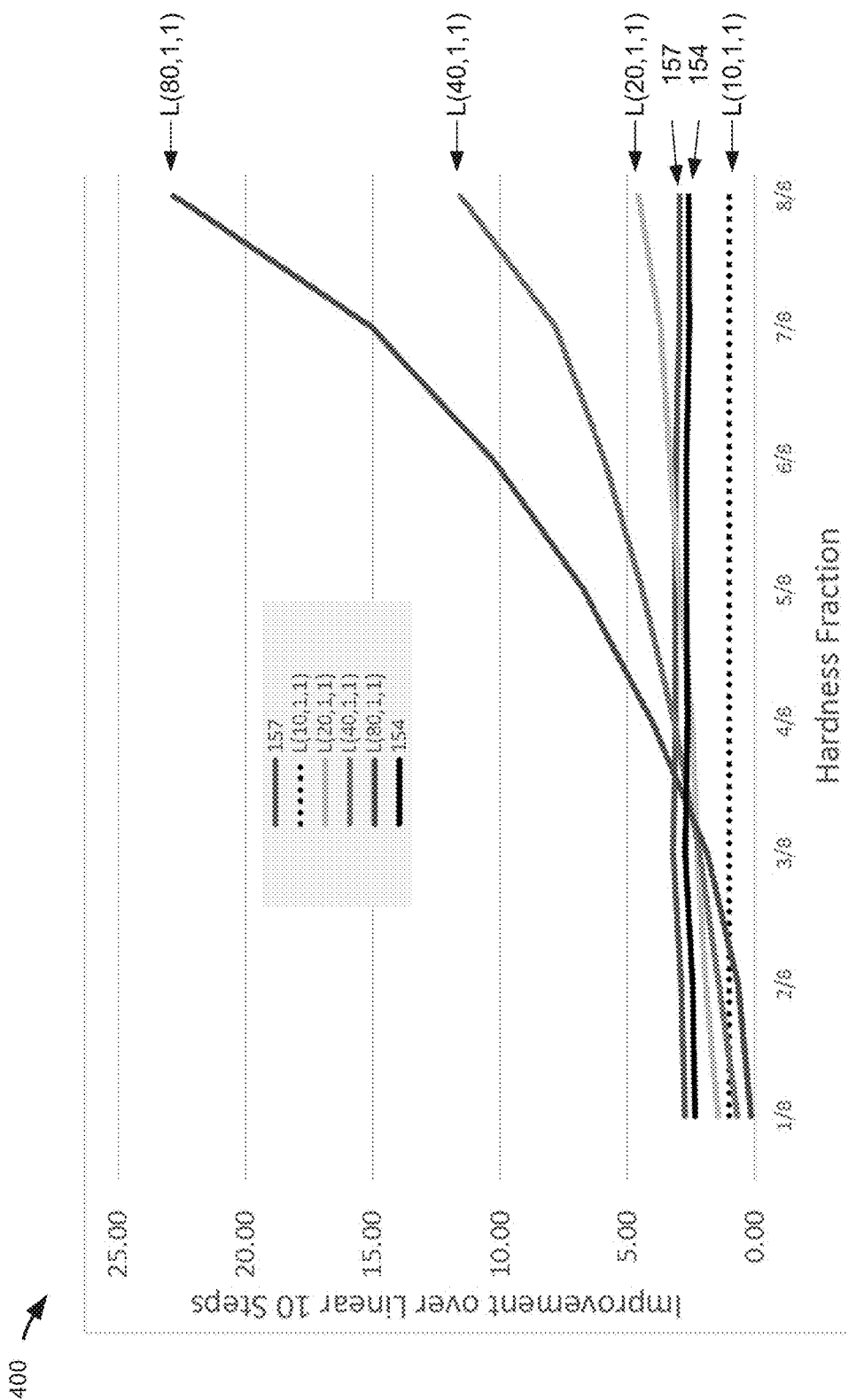
FIG. 4 is a graph showing the ratio of averages for 8 different subsets of the MAX-3-SAT problem.

As a final test, the performance of the algorithm on a MAX-3-SAT problem was also tested. Clauses were of the form $x_i \lor x_j \lor x_k$ (or similar, with some variables negated). Each variable in the clause was chosen independently and uniformly and was equally likely to be negated or not negated (so in this case it is possible to have a clause such as $x_i \lor x_i \lor x_j$ which is just a 2-SAT clause or a clause such as $x_i \lor \bar{x}_i \lor x_j$ which is always true). N=20 variables and 120 clauses were tested (clauses were chosen independently and it was allowed that the same clause to occur more than once). One or more instances were then selected based on, for example, unique ground states. Finally, the hardest 6.8% of problems were chosen based on overlap for L(10,1,1). The results are shown in FIG. 4. It should be emphasized that, in this example, the schedules trained on MAX-2-SAT problems from E. Crosson et al., "Different Strategies for Optimization Using the Quantum Adiabatic Algorithm", arXiv:1401.7320, were used, even tough this is a different problem.

More specifically, graph 400 in FIG. 4 shows the ratio of averages for 8 different subsets of the MAX-3-SAT problem with N=20, chosen by binning by hardness for L(80,1,1). Various schedules are compared to L(10,1,1). 154 and 157 are both learned schedules. Different colors label different schedules. On hardest instances, 157 does best, followed by 154, L(20,1,1),L(10,1,1),L(40,1,1),L(80,1,1) in sequence.

VI. Theoretical Analysis

To better understand why the learned schedules perform well, consider a toy problem. The problem can be written directly as an Ising model (it does not exactly correspond to a MAX-2-SAT problem since some of the terms involve only a single variable). The problem is related to a problem studied in S. Boixo et at., "Experimental signature of programmable quantum annealing", Nature Comm. 4, 3067 (2013), and T. Albash et al., "Consistency Tests of Classical and Quantum Models for a Quantum Annealer", Phys. Rev. A 91, 042314 (2015), but with a significant modification; in those papers, a model was studied which has a large number of classical ground states. All but one of those ground states form a cluster of solutions which are connected by single spin flips, while the remaining ground state is isolated from the others and can only be reached by flipping a large number of spins. It was shown that a quantum annealer will be very likely to end at one of the ground states in the cluster, while a classical annealer in contrast will have a much higher probability of ending at the isolated ground state. For purposes of the current analysis, the problem was modified so that it has only a single unique ground state (the isolated state of the original problem), moving the others to higher energy. In this way, it becomes very difficult for a quantum annealer to locate the ground state.

This is a problem with N=2K spins. K of the spins form what is called the "inner ring", and are arranged in a ring with ferromagnetic couplings of strength ¼. The ¼ is chosen to correspond to the factor of ¼ that arises when translating from a MAX-2-SAT model to an Ising model; in this example, the magnitudes of terms were kept similar to the magnitudes of the terms on the training set. Each of the other spins form what is called the "outer ring". The outer ring spins are not coupled to each other; instead, each outer ring spin is coupled to one inner ring spin (every outer ring spin is coupled to a different inner ring spin), again with ferromagnetic couplings of strength ¼. Finally, on every outer ring spin there is a magnetic field in the Z direction with strength −¼ while on all but one of the the inner ring spins, there is a Z direction magnetic field with strength +¼. Thus, labelling the spins by i=0, . . . , N−1 with 0≤i<K corresponding to the inner ring, one has:

$$H_1 = -\frac{1}{4}\sum_{i=0}^{K-1} S_i^z S_{i+1 \bmod K}^z - \frac{1}{4}\sum_{i=0}^{K-1} S_i^z S_{i+K}^z - \frac{1}{4}\sum_{i=K}^{2K-1} S_i^z + \frac{1}{4}\sum_{i=0}^{K-2} S_i^z. \quad (4)$$

To better understand this model, suppose that instead the Z direction magnetic field was added with strength +¼ to all spins on the inner ring, so that the last term of $H_1$ became $$\frac{1}{4}\sum_{i=0}^{K-1} S_i^z.$$

This model has $2^K+1$ degenerate ground states. The isolated ground state is the state with $S_i^z=+1$ for all i. The cluster of $2^K$ ground states has $S^z=-1$ for all spins on the inner ring while the spins on the outer ring are arbitrary. By removing the Z direction field from one of the spins on the inner ring, the model (4) has a unique unique ground state with $S_i^z=+1$ for all i while the cluster of states with $S^z=-1$ on the inner ring is now an excited state with energy ½ above the ground state.

Now consider the effect of a small transverse magnetic field as occurs near the end of an annealing path. The energy of the unique ground state does not change to linear order in the transverse field strength. However, the energy of the cluster of states does change to linear order, by an amount proportional to the number of spins. Thus such a low order perturbation analysis suggests a level crossing occuring at a transverse magnetic field strength proportional to 1/N (e.g., a level crossing in $H_8$ for (1−s)∼1/N). Of course, since $H_8$ always has a unique ground state this level crossing must become an avoided crossing. However, K∼N spins must flip to move from the cluster to the core, so one may expect that the gap will be small, proportional to the transverse magnetic field strength raised to a power proportional to K. Thus, the gap will be of order $N^{-const \times N}$ for some positive constant.

The performance of various schedules in this model is shown in table VI. For K=2, the slow annealling schedule L(80,1,1) outperforms the others, but already it success probability is noticeably less than 1. For K=2, the slow anneal L(80,1,1) and the fast anneal L(10,1,1) have comparable performance, and for increasing values of K, the slow anneal becomes dramatically worse. This is due to the spectrum of the problem which has a single avoided crossing with very small gap. Comparing L(10,1,1) to 154, it is found that 154 is consistently better and becomes relatively better as K increases. Both L(10,1,1) and 154 show a roughly exponential decay of the squared overlap with increasing K, but the decay is slightly faster for L(10,1,1).

In this example, the Z field was removed from one of the inner spins to break the ground state degeneracy. Another way to do this would have been to vary the field strengths, keeping the same

TABLE V

Absolute squared overlap for various values of K, for learned schedule 154 and for annealing schedules L(10, 1, 1) and L(80, 1, 1).

| K | 154 | L(10, 1, 1) | L(80, 1, 1) |
|---|---|---|---|
| 2 | 0.409 | 0.379 | 0.811 |
| 3 | 0.237 | 0.208 | 0.212 |
| 4 | 0.157 | 0.104 | 0.0182 |
| 5 | 0.1 | 0.0493 | 0.000683 |
| 6 | 0.0582 | 0.0233 | $1.25 \times 10^{-5}$ |
| 7 | 0.0313 | 0.011 | $9.37 \times 10^{-6}$ |
| 8 | 0.0169 | 0.00524 | $1.34 \times 10^{-5}$ |
| 9 | 0.0095 | 0.00248 | $4. \times 10^{-6}$ |
| 10 | 0.00543 | .00118 | $5.42 \times 10^{-7}$ | field on all inner spins but making it slightly weaker.

VII. Example Generalized Environments

Figure 8:
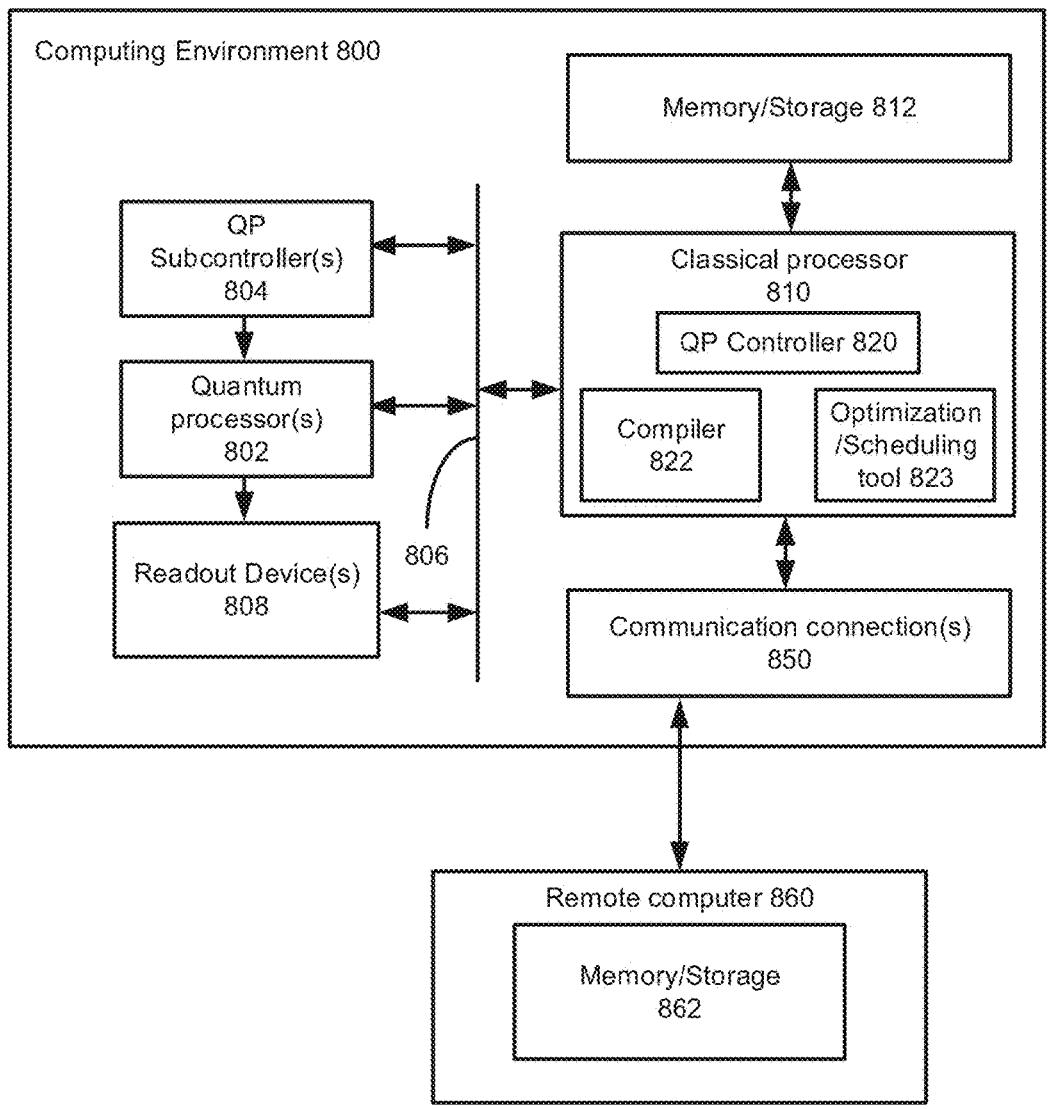
FIG. 8 is a schematic block diagram illustrating an example system for controlling a quantum computing system in accordance with embodiments of the disclosed technology.
Figure 9:
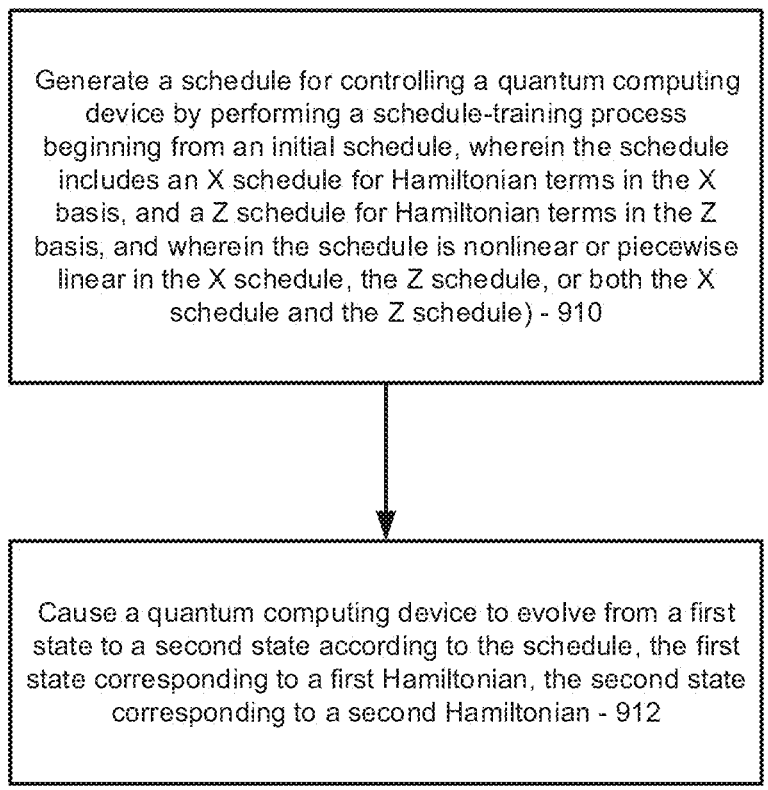
FIG. 9 is a flow chart illustrating a first example method for generating a schedule and controlling a computing computing device in accordance with the schedule.

FIG. 9 is a flowchart 900 showing a generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. Still further, the identified operations need not be performed by a single software module, but can be implemented using multiple modules or software tools, which collectively perform the illustrated method. The example embodiment of FIG. 9 can be performed, for example, by one or more computers configured to generate schedules for controlling a quantum computing device and for actually controlling the quantum computing device (e.g., as illustrated in FIG. 8).

At 910, a schedule for controlling a quantum computing device is generated by performing a schedule-training process beginning from an initial schedule.

At 912, a quantum computing device is caused to evolve from a first state to a second state according to the schedule, the first state corresponding to a first Hamiltonian, the second state corresponding to a second Hamiltonian.

In this example, the schedule includes an X schedule for Hamiltonian terms in the X basis, and a Z schedule for Hamiltonian terms in the Z basis. Further, the schedule is nonlinear or piecewise linear in at least one of the X schedule or the Z schedule (e.g., the X schedule, the Z schedule, or both the X schedule and the Z schedule).

In some implementations, the schedule includes one or more sequences where the X schedule and the Z schedule converge toward one another and one or more sequences where the X schedule and the Z schedule diverge from one another. In further implementations, the X schedule and the Z schedule intersect only in a latter half of the respective schedules. In some implementations, one or both of the X schedule or the Z schedule has terms that vary, and the variation in terms is greater in a latter half of the respective schedule than in a front half of the respective schedule. The initial schedule of these embodiments includes an initial X schedule for Hamiltonian terms in the X basis and an initial Z schedule for Hamiltonian terms in the Z basis. The initial schedule can have a variety of characteristics that contribute to the final schedule. In some implementations, the initial X schedule and the initial Z schedule are both constant. In further implementations, one of the initial X schedule or the initial Z schedule is constant, and the other one of the initial X schedule or the initial Z schedule is nonconstant. In some implementations, one of the initial X schedule or the initial Z schedule is linear, and the other one of the initial X schedule or the initial Z schedule is nonlinear and nonconstant. In further implementations, one or both of the initial X schedule or the initial Z schedule have terms that vary with greater degree in a latter half of the respective schedule. In some implementations, one or both of the initial X schedule or the initial Z schedule have terms that vary with greater degree in a latter half of the respective schedule. In further implementations, one or both of the initial X schedule or the initial Z schedule have terms that are constant in a first half of the respective schedule and that vary in a second half of the respective schedule. Still further, in some embodiments, the second Hamiltonian is a solution to an optimization problem, and the schedule-training process uses one or more training problems having a size that is a smaller than a size of the optimization problem. In some embodiments, the method further comprises generating the schedule by: modifying an initial schedule from its initial state to create a plurality of modified schedules; testing the modified schedules relative to one or more problem instances; selecting one of the modified schedules based on an observed improvement in solving one or more of the problem instances. Further, in some implementations, the generating further comprises iterating the acts of modifying, testing, and selecting until no further improvement is observed in the selected modified schedule. In certain embodiments, for at least one step of the Z schedule or X schedule, the sign of the Z schedule or X schedule step is opposite of the sign of the respective final step of the Z schedule or X schedule. Further, in some embodiments, for at least one step of the Z schedule or X schedule, the sign of the Z schedule or X schedule step switches from positive to negative or vice versa. In further embodiments, one or more terms of the first Hamiltonian are noncommuting with corresponding terms of the second Hamiltonian.

Figure 10:
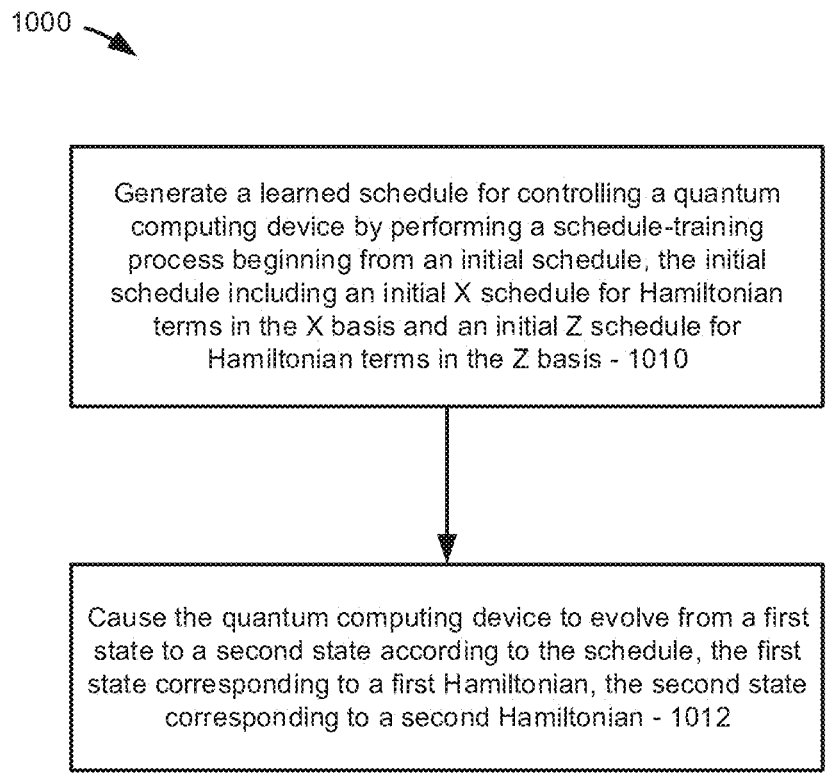
FIG. 10 is a flow chart illustrating a second example method for generating a schedule and controlling a computing computing device in accordance with the schedule.

FIG. 10 is a flowchart showing another generalized example embodiment for implementing an embodiment of the disclosed technology. The particular operations and sequence of operations should not be construed as limiting, as they can be performed alone or in any combination, subcombination, and/or sequence with one another. Additionally, the illustrated operations can be performed together with one or more other operations. Still further, the identified operations need not be performed by a single software module, but can be implemented using multiple modules or software tools, which collectively perform the illustrated method. The example embodiment of FIG. 10 can be performed, for example, by one or more computers configured to generate schedules for controlling a quantum computing device and for actually controlling the quantum computing device (e.g., as illustrated in FIG. 8).

At 1010, a learned schedule for controlling a quantum computing device is generated by performing a schedule-training process beginning from an initial schedule, the initial schedule including an initial X schedule for Hamiltonian terms in the X basis and an initial Z schedule for Hamiltonian terms in the Z basis.

At 1012, the learned schedule is used to control the quantum computing device. For example, the learned schedule can be used to cause the quantum computing device to evolve from a first state to a second state according to the schedule, the first state corresponding to a first Hamiltonian, the second state corresponding to a second Hamiltonian.

In certain implementations, at least one of the initial X schedule or the initial Z schedule is nonlinear. In some implementations, the initial X schedule and the initial Z schedule are both constant. In certain implementations, one of the initial X schedule or the initial Z schedule is constant, and the other one of the initial X schedule or the initial Z schedule is nonconstant. In some implementations, one of the initial X schedule or the initial Z schedule is linear, and the other one of the initial X schedule or the initial Z schedule is nonlinear and nonconstant. In certain implementations, one or both of the initial X schedule or the initial Z schedule have terms that vary with greater degree in a latter half of the respective schedule. In some implementations, one or both of the initial X schedule or the initial Z schedule have terms that are constant in a first half of the respective schedule and that vary in a second half of the respective schedule. In certain implementations, the learned schedule includes a learned X schedule and a learned Z schedule comprising one or more sequences where the learned X schedule and the learned Z schedule converge toward one another and one or more sequences where the learned X schedule and the learned Z schedule diverge from one another. In some implementations, the learned X schedule and the learned Z schedule intersect only in a latter half of the respective schedules. In certain implementations, one or both of the learned X schedule or the learned Z schedule have terms that vary, and the variation in terms is greater in a latter half of the respective schedule than in a front half of the respective schedule. In some implementations, for at least one step of the learned Z schedule or the learned X schedule, the sign of the learned Z schedule or learned X schedule step is opposite of the sign of the respective final step of the learned Z schedule or learned X schedule. In certain implementations, for at least one step of the learned Z schedule or learned X schedule, the sign of the learned Z schedule or learned X schedule step switches from positive to negative or vice versa.

Any of the example embodiments disclosed herein can be performed by a system comprising a processor and memory and/or by a tool adapted for use in a quantum optimization/schedule-generation/control process and implemented by one or more computing devices. Further, any of the example optimization/schedule-generation/control methods can be implemented as computer-executable instructions stored on a computer-readable media, which when executed by a computer cause the computer to perform the method.

VIII. Example Computing Environments

Figure 5:
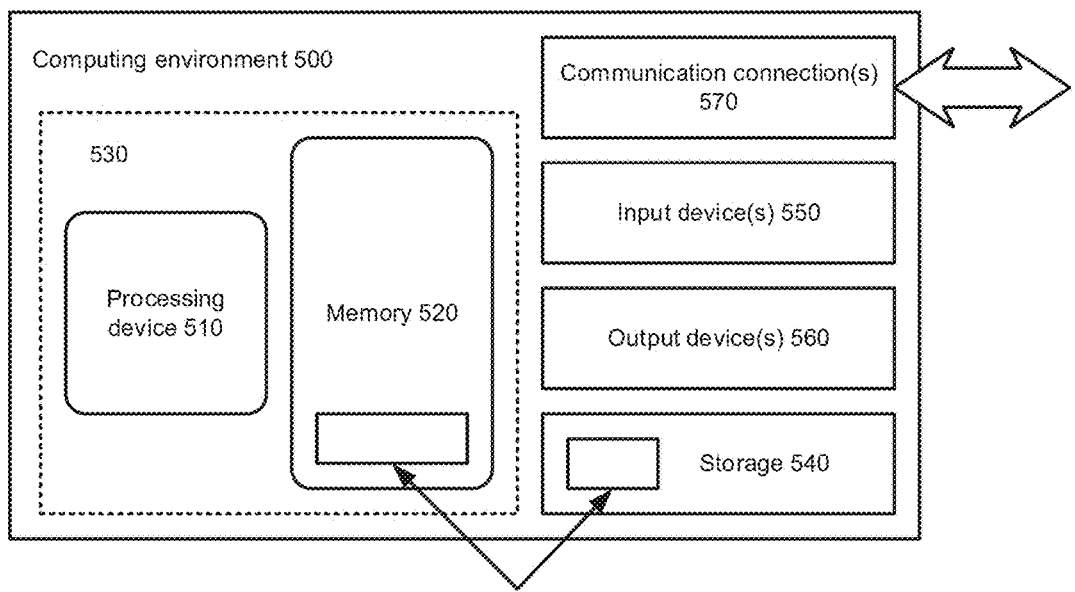
FIG. 5 is a schematic block diagram illustrating a generalized example of a suitable computing environment 500 in which several of the described embodiments can be implemented.

FIG. 5 illustrates a generalized example of a suitable computing environment 500 in which several of the described embodiments can be implemented. The computing environment 500 is not intended to suggest any limitation as to the scope of use or functionality of the disclosed technology, as the techniques and tools described herein can be implemented in diverse general-purpose or special-purpose environments that have computing hardware.

With reference to FIG. 5, the computing environment 500 includes at least one processing device 510 and memory 520. In FIG. 5, this most basic configuration 530 is included within a dashed line. The processing device 510 (e.g., a CPU or microprocessor) executes computer-executable instructions. In a multi-processing system, multiple processing devices execute computer-executable instructions to increase processing power. The memory 520 may be volatile memory (e.g., registers, cache, RAM, DRAM, SRAM), non-volatile memory (e.g., ROM, EEPROM, flash memory), or some combination of the two. The memory 520 stores software 580 implementing one or more of the described optimization, schedule-generation, and/or control techniques described herein. For example, the memory 520 can store software 580 for implementing any of the disclosed techniques described herein and their accompanying user interfaces.

The computing environment can have additional features. For example, the computing environment 500 includes storage 540, one or more input devices 550, one or more output devices 560, and one or more communication connections 570. An interconnection mechanism (not shown), such as a bus, controller, or network, interconnects the components of the computing environment 500. Typically, operating system software (not shown) provides an operating environment for other software executing in the computing environment 500, and coordinates activities of the components of the computing environment 500.

The storage 540 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 500. The storage 540 can also store instructions for the software 580 implementing any of the described techniques, systems, or environments.

The input device(s) 550 can be a touch input device such as a keyboard, touchscreen, mouse, pen, trackball, a voice input device, a scanning device, or another device that provides input to the computing environment 500. The output device(s) 560 can be a display device (e.g., a computer monitor, laptop display, smartphone display, tablet display, netbook display, or touchscreen), printer, speaker, or another device that provides output from the computing environment 500.

The communication connection(s) 570 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 520 and/or storage 540, and do not include propagating carrier waves or signals per se (tangible computer-readable memory or storage devices do not include propagating carrier waves or signals per se).

The various methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 6:
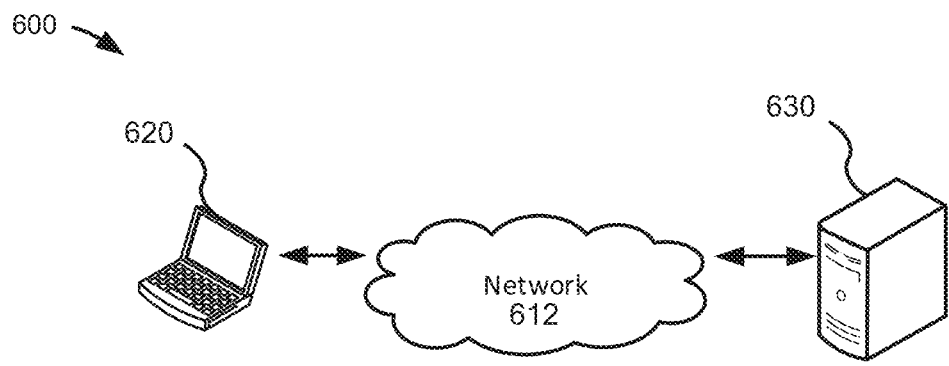
FIG. 6 is a schematic block diagram illustrating an example of a possible network topology 600 (e.g., a client-server network) for implementing a system according to the disclosed technology.

An example of a possible network topology 600 (e.g., a client-server network) for implementing a system according to the disclosed technology is depicted in FIG. 6. Networked computing device 620 can be, for example, a computer running a browser or other software connected to a network 612. The computing device 620 can have a computer architecture as shown in FIG. 5 and discussed above. The computing device 620 is not limited to a traditional personal computer but can comprise other computing hardware configured to connect to and communicate with a network 612 (e.g., smart phones, laptop computers, tablet computers, or other mobile computing devices, servers, network devices, dedicated devices, and the like). In the illustrated embodiment, the computing device 620 is configured to communicate with a computing device 630 (e.g., a remote server, such as a server in a cloud computing environment) via a network 612. In the illustrated embodiment, the computing device 620 is configured to transmit input data to the computing device 630, and the computing device 630 is configured to implement any of the disclosed optimization, schedule-generation, and/or control methods and output results to the computing device 620. Any of the data received from the computing device 630 can be stored or displayed on the computing device 620 (e.g., displayed as data on a graphical user interface or web page at the computing devices 620). In the illustrated embodiment, the illustrated network 612 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 612 can be the Internet or a similar public network and operate using an appropriate protocol (e.g., the HTTP protocol).

Figure 7:
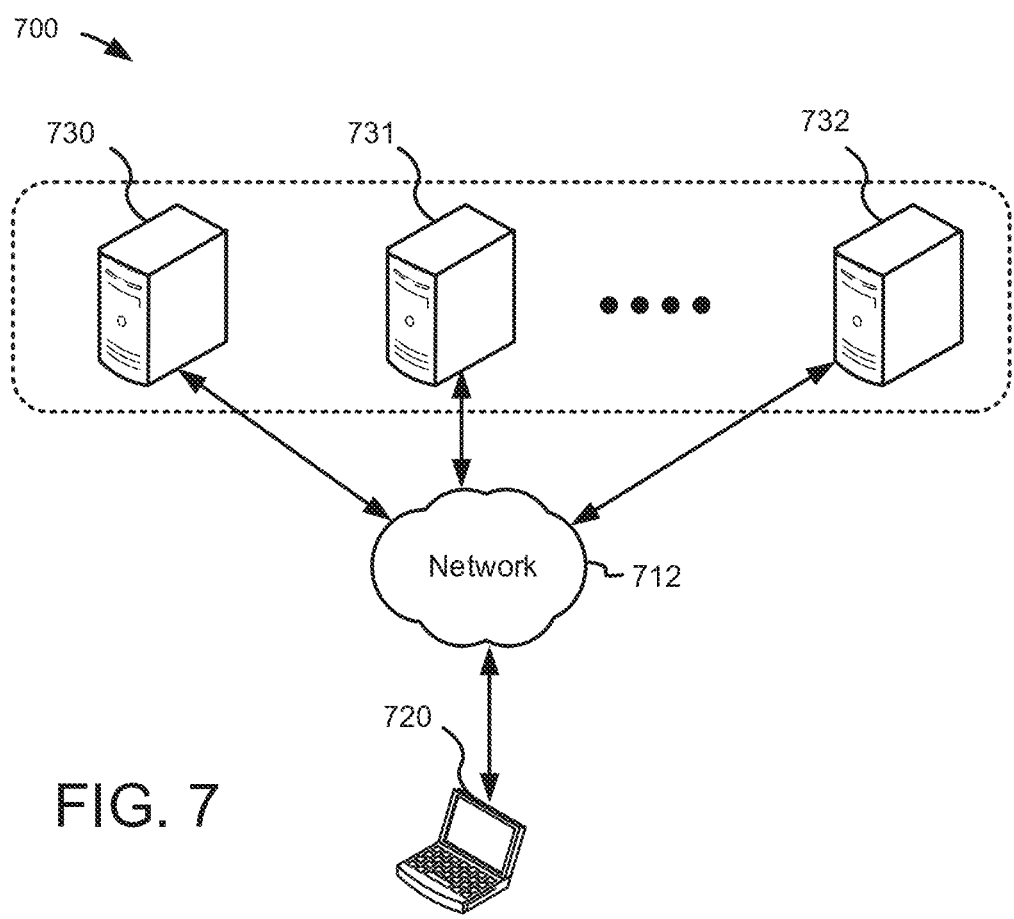
FIG. 7 is a schematic block diagram illustrating another example of a possible network topology 600 (e.g., a distributed computing environment) for implementing a system according to the disclosed technology.

Another example of a possible network topology 700 (e.g., a, distributed computing environment) for implementing a system according to the disclosed technology is depicted in FIG. 7. Networked computing device 720 can be, for example, a computer running a browser or other software connected to a network 712. The computing device 720 can have a computer architecture as shown FIG. 5 and discussed above. In the illustrated embodiment, the computing device 720 is configured to communicate with multiple computing devices 730, 731, 732 (e.g., remote servers or other distributed computing devices, such as one or more servers in a cloud computing environment) via the network 712. In the illustrated embodiment, each of the computing devices 730, 731, 732 in the computing environment 700 is used to perform at least a portion of the optimization, schedule-generation, and/or control process. In other words, the computing devices 730, 731, 732 form a distributed computing environment in which the optimization/schedule-generation/control process is shared across multiple computing devices. The computing device 720 is configured to transmit input data to the computing devices 730, 731, 732, which are configured to distributively implement a optimization/schedule-generation/control process, including performance of any of the disclosed methods, and to provide results to the computing device 720. Any of the data received from the computing devices 730, 731, 732 can be stored or displayed on the computing device 720 (e.g., displayed as data on a graphical user interface or web page at the computing devices 720). The illustrated network 712 can be any of the networks discussed above with respect to FIG. 6.

With reference to FIG. 8, an exemplary system for implementing the disclosed technology includes computing environment 800. In computing environment 800, a compiled quantum computer circuit description can be used to program (or configure) one or more quantum processing units such that the quantum processing unit(s) implement the sequence of reversible gates described by the quantum computer circuit description. The quantum computer circuit description can be generated from any suitable quantum computer compiler and can include the sequence of gates used to solve a targeted problem (e.g., an optimization problem).

The environment 800 includes one or more quantum processing units 802 and one or more readout device(s) 808. The quantum processing unit(s) execute quantum circuits that are precompiled and described by the quantum computer circuit description. The quantum processing unit(s) can be one or more of, but are not limited to: (a) a superconducting quantum computer; (b) (b) a topological quantum computer; (c) an ion trap quantum computer; or (d) a fault-tolerant architecture for quantum computing. The precompiled quantum circuits can be sent into (or otherwise applied to) the quantum processing unit(s) via control lines 806 at the control of quantum processor controller 820. The quantum processor controller (QP controller) 820 can operate in conjunction with a classical processor 810 to implement the desired quantum computing process. In the illustrated example, the QP controller 820 further implements the desired quantum computing process via one or more QP subcontrollers 804 that are specially adapted to control a corresponding one of the quantum processor(s) 802. For instance, in one example, the quantum controller 820 facilitates implementation of the compiled quantum circuit by sending instructions to one or more memories (e.g., lower-temperature memories), which then pass the instructions to low-temperature control unit(s) (e.g., QP subcontroller(s) 804) that transmit, for instance, pulse sequences representing the gates to the quantum processing unit(s) 802 for implementation. In other examples, the QP controller(s) 820 and QP subcontroller(s) 804 operate to provide appropriate magnetic fields, encoded operations, or other such control signals to the quantum processor(s) to implement the operations of the compiled quantum computer circuit description. For instance, the QP controller(s) 820 and QP subcontroller(s) can apply control signals (e.g., magnetic fields, etc.) to the quantum processor(s) in accordance with a schedule, such as a schedule generated using any of the disclosed optimization/schedule-generation techniques described herein. The quantum controller(s) can further interact with readout devices 808 to help control and implement the desired quantum computing process (e.g., by reading or measuring out data results from the quantum processing units once available, etc.)

With reference to FIG. 8, compilation is the process of translating a high-level description of a quantum algorithm into a quantum circuit comprising a sequence of quantum operations or gates. The compilation can be performed by a compiler 822 using a classical processor 810 of the environment 800 which loads the high-level description from memory or storage devices 812 and stores the resulting quantum computer circuit description in the memory or storage devices 812. Further, the compiler 822 and/or the compilation of any particular high-level description into a quantum computer description can be verified using a verification tool (not shown). In some cases, the verification tool 823 will be implemented as a separate software tool, while in other cases, it may be integrated with the compiler itself.

Further, a schedule for operating the quantum processor(s) 802 to achieve the desired computation (as defined by the compiled quantum computer circuit description) can be generated by a optimization and/or schedule-generation tool 823 using any of the embodiments disclosed herein. For instance, a schedule can entirely generated by the claissical processor 810 or, in some cases, some of the schedule generation process itself may be implemented using the quantum processor(s). For instance, a learned schedule (trained on a smaller-sized instances (such as sizes of N that are 50 or less, or 25 or less)) may be generated using the classical processor whereas the testing of the schedule on a larger problem can be performed using the quantum processor(s) 802. Any resulting schedule can then be stored in the memory or storage devices 812. Further, in some example cases, the optimization/schedule-generation tool 823 will be implemented as a separate software tool, while in other cases, it may be integrated with the compiler itself.

In other embodiments, compilation, optimization, and/or schedule-generation can be performed remotely by a remote computer 860 (e.g., a computer having a computing environment as described above with respect to FIG. 5) which stores the resulting quantum computer circuit description and/or schedule(s) in one or more memory or storage devices 862 and transmits the quantum computer circuit description and/or schedule(s) to the computing environment 800 for implementation in the quantum processing unit(s) 802. Still further, the remote computer 800 can store the high-level description or optimization problem for which a Hamiltonian and schedule are to be generated in the memory or storage devices 862 and transmit the high-level description and/or optimization problem to the computing environment 800 for compilation and/or optimization/schedule generation and use with the quantum processor(s). In any of these scenarios, results from the computation performed by the quantum processor(s) can be communicated to the remote computer after and/or during the computation process. Still further, the remote computer can communicate with the QP controller(s) 820 such that the quantum computing process (including any compilation, verification, and QP processor control procedures) can be remotely controlled by the remote computer 860. In general, the remote computer 860 communicates with the QP controller(s) 820, compiler 822, and/or optimization/schedule-generation tool 823 via communication connections 850. In particular embodiments, the environment 800 can be a cloud computing environment, which provides the quantum processing resources of the environment 800 to one or more remote computers (such as remote computer 860) over a suitable network (which can include the internet).

IX. Appendix

Here, the parameters for certain learned schedules are given.

TABLE VI $\theta^Z$ for certain learned schedules. First column gives key indicating particular learned schedule number (the number itself is meaningless and serves only as a key. Second column gives initial schedule for training (see table I).

| Schdl | Init | $\theta_1^Z$ | $\theta_2^Z$ | $\theta_3^Z$ | $\theta_4^Z$ | $\theta_5^Z$ | $\theta_6^Z$ | $\theta_7^Z$ | $\theta_8^Z$ | $\theta_9^Z$ | $\theta_{10}^Z$ |
|---|---|---|---|---|---|---|---|---|---|---|---|
| 8 | 8 | −0.279307 | 0.313947 | 0.614148 | −0.220295 | 0.256869 | 0.465194 | −0.212299 | 0.312254 | 1.50651 | 2.011013 |
| 31 | 9 | 0.368606 | 0.359748 | 0.190667 | 0.392364 | 0.208514 | 0.021365 | 0.642995 | 1.143198 | 1.64574 | 1.814225 |
| 49 | 9 | 0.424251 | 0.771576 | 0.464935 | 0.435078 | 0.404496 | 0.187802 | 0.77197 | 1.300528 | 1.701031 | 1.745732 |
| 84 | 11 | 0.1629 | −0.496857 | 0.450711 | −0.791892 | 0.326329 | −0.475372 | 0.433593 | 1.033271 | 1.659841 | 2.031027 |
| 113 | 12 | 0.37599 | 0.680923 | 0.997025 | 0.715514 | 0.271968 | 0.519316 | 1.068852 | 1.443309 | 1.433469 | 1.333607 |
| 122 | 12 | 0.489956 | 0.510331 | 0.740654 | 0.538733 | 0.245925 | 0.08665 | 0.761729 | 1.188631 | 1.418336 | 1.89151 |
| 154 | 14 | 0.748224 | −0.080047 | −0.117857 | 0.316126 | 0.096738 | −0.307805 | 1.210155 | 1.183015 | 1.557269 | 1.745549 |
| 157 | 14 | 0.677717 | −0.099922 | −0.055678 | 0.294502 | 0.107643 | −0.276445 | 1.070014 | 1.057304 | 1.479656 | 1.646192 |

TABLE VII $\theta^X$ for certain learned schedules. First column gives key indicating particular learned schedule number (the number itself is meaningless and serves only as a key. Second column gives initial schedule for training (see table I).

| Schedule | Initial | $\theta_1^X$ | $\theta_2^X$ | $\theta_3^X$ | $\theta_4^X$ | $\theta_5^X$ | $\theta_6^X$ | $\theta_7^X$ | $\theta_8^X$ | $\theta_9^X$ | $\theta_{10}^X$ |
|---|---|---|---|---|---|---|---|---|---|---|---|
| 8 | 8 | 0.985164 | 1.711707 | 1.308381 | 1.272364 | 0.71373 | 2.073916 | 1.340572 | 1.037615 | 1.217506 | 0.730447 |
| 31 | 9 | 1.168114 | 1.375238 | 1.350988 | 1.356165 | 1.337642 | 1.091975 | 1.426565 | 1.162721 | 0.885662 | 0.431466 |
| 49 | 9 | 1.510793 | 1.665954 | 1.205267 | 1.062189 | 1.59617 | 1.481757 | 1.6141 | 1.285973 | 0.903954 | 0.396039 |
| 84 | 11 | 1.945308 | 1.142874 | 0.875239 | 0.914909 | 1.373274 | 1.191093 | 2.016909 | 1.142808 | 1.104454 | 0.585 |
| 113 | 12 | 1.609044 | 1.459435 | 1.971842 | 1.625206 | 1.537716 | 1.515011 | 1.398038 | 0.983823 | 0.5701 | 0.273691 |
| 122 | 12 | 1.683547 | 0.979162 | 1.878078 | 1.631202 | 1.16941 | 1.055429 | 1.635904 | 1.172053 | 0.795996 | 0.519226 |
| 154 | 14 | 1.35801 | 0.955197 | 1.397257 | 1.219015 | 1.396977 | 1.420552 | 1.283791 | 0.889047 | 0.671747 | 0.339493 |
| 157 | 14 | 1.359167 | 1.060199 | 1.293059 | 1.248988 | 1.328482 | 1.431533 | 1.237331 | 0.854213 | 0.688784 | 0.382808 |

Here, one example optimization algorithm for training the initial schedules is provided. This particular example should not be construed as limiting, however, as the particular values for step size, attempts, multiples, threshold numbers of improved sets, and the like can be varied from implementation to implementation.

One example procedure is described by the following pseudocode:

```
mul = 0.1
For iter in range(3):
    For cnt in range(50):
        For each theta:
            t.cur = t.cur + 2.*(random( )−0.5)*mul
        If good¡3 then: mul *= 0.5
        If good¿5 then: mul *= 2.0
        f mul¡0.00005: break
```

This pseudocode corresponds to the following procedure:
1. Start at 0.1 for a step size;
2. At each step, use the multiplier to add/subtract noise from the current value;
3. After every 50 attempts:
   a. If less than 3 improved sets of thetas are found, then divide the step size by 2
   b. If more than 5 improved sets of thetas are found, then multiply the step size by 2
   c. If the step size gets small enough, stop
4. Repeat the whole process 3 times (unless it was decided to stop in 3.c.);
5. Now do a Powell line search; and
6. If both the Noise and Powell search couldnt improve, stop otherwise go back to step 1.

X. Concluding Remarks

Disclosed herein are example methods for applying a numerical search to find schedules for a modification of the QAOA algorithm. These schedules were trained on a small subset of problems with 20 bits, but were found to perform well on the full set of such instances as well as related but slightly different ensembles with 20, 24, 28 bits. The performance of these schedules indicate that they outperform annealing on larger sizes, and thus represent a useful application for a quantum computer.

Embodiments of the disclosed technology can also be adapted for weighted SAT problems, where each clause comes with some arbitrary energy cost for violating that clause. In such a case, all clauses could have the same weight; this does not change the ground state of $H_1$ but simply scales $H_1$ by some factor. Or, the weights can be varied. Further, by training the schedules on a range of such weighted problems (for example, training on a set of 10 random instances as well as those instances rescaled by various factors), the schedules can have improved ability to deal with any rescaling.

Because certain hardware implementations of quantum computers may have limitations in the manner in which they can be controlled, some schedules where $\theta^Z$ simply does a linear ramp were considered. Such schedules may be easier to implement, depending on the target hardware. Further, any schedule where $\theta^Z$ has a fixed sign can be implemented by taking a time-varying $\theta^X$ and a time-constant $\theta^Z$. That is, suppose one has the abiility to time-evolve under the Hamiltonian $g^X H_0 + g^Z H_1$ for arbitrary $g^X$ and some given $g^Z$; then, to implement a unitary transformation $\exp[i(\theta^X H_0 + \theta^Z H_1)]$ one should evolve under the Hamiltonian $g^X H_0 + g^Z H_1$ for $g^X = g^Z \theta^X / \theta^Z$ and do the evolution for time $\theta^Z / g^Z$.

Embodiments of the disclosed technology demonstrate that the desirability of having an appropriate initial schedule, as otherwise the learning gets trapped in local optima. Thus, while it may be the case that one can learn a schedule on a classical computer using a modest number of qubits and then apply it on a quantum computer with a larger number of qubits, the learned schedule might also be a good starting point for further optimization of schedules on the quantum computer.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above axe provided for convenient illustration, and other arrangements can be used.

What is claimed is:

1. A method of operating a quantum computing device, comprising:
   causing a quantum computing device to evolve from a first state to a second state according to a schedule that is neither annealing nor adiabatic, the first state corresponding to a first Hamiltonian, the second state corresponding to a second Hamiltonian, wherein the schedule includes an X schedule for Hamiltonian terms in the X basis, and a Z schedule for Hamiltonian terms in the Z basis, and wherein the schedule is nonlinear or piecewise linear in the X schedule, the Z schedule, or both the X schedule and the Z schedule.

2. The method of claim 1, wherein the schedule includes one or more sequences where the X schedule and the Z schedule converge toward one another and one or more sequences where the X schedule and the Z schedule diverge from one another.

3. The method of claim 1, wherein the X schedule and the Z schedule intersect only in a latter half of the respective schedules.

4. The method claim 1, wherein one or both of the X schedule or the Z schedule has terms that vary and wherein the variation in terms is greater in a latter half of the respective schedule than in a front half of the respective schedule.

5. The method of claim 1, further comprising generating the schedule by performing a schedule-training process beginning from an initial schedule, wherein the initial schedule includes one or more of:
   (a) an initial X schedule for Hamiltonian terms in the X basis and an initial Z schedule for Hamiltonian terms in the Z basis, and wherein the initial X schedule and the initial Z schedule are both constant;
   (b) an initial X schedule for Hamiltonian terms in the X basis and an initial Z schedule for Hamiltonian terms in the Z basis, and wherein one of the initial X schedule or the initial Z schedule is constant, and the other one of the initial X schedule or the initial Z schedule is nonconstant;
   (c) an initial X schedule for Hamiltonian terms in the X basis and an initial Z schedule for Hamiltonian terms in the Z basis, and wherein one of the initial X schedule or the initial Z schedule is linear, and the other one of the initial X schedule or the initial Z schedule is nonlinear and nonconstant;
(d) an initial X schedule for Hamiltonian terms in the X basis and an initial Z schedule for Hamiltonian terms in the Z basis, and wherein one or both of the initial X schedule or the initial Z schedule have terms that vary with greater degree in a latter half of the respective schedule;
(e) an initial X schedule for Hamiltonian terms in the X basis and an initial Z schedule for Hamiltonian terms in the Z basis, and wherein one or both of the initial X schedule or the initial Z schedule have terms that vary with greater degree in a latter half of the respective schedule; or
(f) an initial X schedule for Hamiltonian terms in the X basis and an initial Z schedule for Hamiltonian terms in the Z basis, and wherein one or both of the initial X schedule or the initial Z schedule have terms that are constant in a first half of the respective schedule and that vary in a second half of the respective schedule.

6. The method of claim 1, wherein the second Hamiltonian is a solution to an optimization problem, and wherein the schedule-training process uses one or more training problems.

7. The method of claim 1, further comprising generating the schedule by:
modifying an initial schedule from its initial state to create a plurality of modified schedules;
testing the modified schedules relative to one or more problem instances;
selecting one of the modified schedules based on an observed improvement in solving one or more of the problem instances.

8. The method of claim 7, wherein the generating further comprises iterating the acts of modifying, testing, and selecting until no further improvement is observed in the selected modified schedule.

9. The method of claim 1, wherein, for at least one step of the Z schedule or X schedule, the sign of the Z schedule or X schedule step is opposite of the sign of the respective final step of the Z schedule or X schedule.

10. The method of claim 1, wherein, for at least one step of the Z schedule or X schedule, the sign of the Z schedule or X schedule step switches from positive to negative or vice versa.

11. The method of claim 1, wherein one or more terms of the first Hamiltonian are noncommuting with corresponding terms of the second Hamiltonian.

12. A method, comprising:
generating a learned schedule for controlling a quantum computing device by performing a schedule-training process beginning from an initial schedule, wherein the initial schedule includes an initial X schedule for Hamiltonian terms in the X basis and an initial Z schedule for Hamiltonian terms in the Z basis.

13. The method of claim 12, wherein at least one of the initial X schedule or the initial Z schedule is nonlinear.

14. The method of claim 12, wherein the initial X schedule and the initial Z schedule are both constant.

15. The method of claim 12, wherein one of the initial X schedule or the initial Z schedule is constant, and the other one of the initial X schedule or the initial Z schedule is nonconstant.

16. The method of claim 12, wherein one of the initial X schedule or the initial Z schedule is linear, and the other one of the initial X schedule or the initial Z schedule is nonlinear and nonconstant.

17. The method of claim 12, wherein one or both of the initial X schedule or the initial Z schedule have terms that vary with greater degree in a latter half of the respective schedule.

18. The method of claim 12, wherein one or both of the initial X schedule or the initial Z schedule have terms that are constant in a first half of the respective schedule and that vary in a second half of the respective schedule.

19. The method of claim 12, wherein the learned schedule includes one of:
(a) a learned X schedule for Hamiltonian terms in the X basis and a learned Z schedule for Hamiltonian terms in the Z basis, wherein the learned schedule includes one or more sequences where the learned X schedule and the learned Z schedule converge toward one another and one or more sequences where the learned X schedule and the learned Z schedule diverge from one another;
(b) a learned X schedule for Hamiltonian terms in the X basis and a learned Z schedule for Hamiltonian terms in the Z basis, wherein the learned X schedule and the learned Z schedule intersect only in a latter half of the respective schedules;
(c) a learned X schedule for Hamiltonian terms in the X basis and a learned Z schedule for Hamiltonian terms in the Z basis, and wherein one or both of the learned X schedule or the learned Z schedule have terms that vary and wherein the variation in terms is greater in a latter half of the respective schedule than in a front half of the respective schedule;
(d) a learned X schedule for Hamiltonian terms in the X basis and a learned Z schedule for Hamiltonian terms in the Z basis, and wherein, for at least one step of the learned Z schedule or learned X schedule, the sign of the learned Z schedule or learned X schedule step is opposite of the sign of the respective final step of the learned Z schedule or learned X schedule; or
(e) a learned X schedule for Hamiltonian terms in the X basis and a learned Z schedule for Hamiltonian terms in the Z basis, and wherein, for at least one step of the learned Z schedule or learned X schedule, the sign of the learned Z schedule or learned X schedule step switches from positive to negative or vice versa.

20. A system, comprising:
a processor; and
at least one memory coupled to the processor and having stored thereon processor-executable instructions for:
generating a schedule that is neither annealing nor adiabatic for controlling a quantum computing device by performing a schedule-training process beginning from an initial schedule; and
causing a quantum computing device to evolve from a first state to a second state according to the schedule, the first state corresponding to a first Hamiltonian, the second state corresponding to a second Hamiltonian,
wherein the schedule includes an X schedule for Hamiltonian terms in the X basis, and a Z schedule for Hamiltonian terms in the Z basis, and
wherein the schedule is nonlinear or piecewise linear in one or both of the X schedule or the Z schedule.

* * * * *